(12) United States Patent
Muharemovic et al.

(10) Patent No.: US 9,444,650 B2
(45) Date of Patent: Sep. 13, 2016

(54) METHODS AND APPARATUS TO ALLOCATE REFERENCE SIGNALS IN WIRELESS COMMUNICATION SYSTEMS

(75) Inventors: Tarik Muharemovic, Dallas, TX (US); Zukang Shen, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 704 days.

(21) Appl. No.: 11/741,360

(22) Filed: Apr. 27, 2007

(65) Prior Publication Data

US 2007/0253465 A1 Nov. 1, 2007

Related U.S. Application Data

(60) Provisional application No. 60/745,820, filed on Apr. 27, 2006.

(51) Int. Cl.
| | |
|---|---|
| *H04L 27/04* | (2006.01) |
| *H04L 12/66* | (2006.01) |
| *H04L 5/00* | (2006.01) |
| *H04L 25/02* | (2006.01) |
| *H04L 27/26* | (2006.01) |
| *H04W 52/22* | (2009.01) |
| *H04J 13/00* | (2011.01) |
| *H04J 13/14* | (2011.01) |
| *H04W 16/18* | (2009.01) |

(52) U.S. Cl.
CPC ............ *H04L 12/66* (2013.01); *H04J 13/0062* (2013.01); *H04J 13/14* (2013.01); *H04L 5/0007* (2013.01); *H04L 5/0016* (2013.01); *H04L 5/0026* (2013.01); *H04L 25/0224* (2013.01); *H04L 25/0226* (2013.01); *H04L 25/0228* (2013.01); *H04L 27/2613* (2013.01); *H04W 52/223* (2013.01); *H04W 16/18* (2013.01)

(58) Field of Classification Search
USPC .......................... 375/295, 130, 148; 455/519
See application file for complete search history.

(56) References Cited

U.S. PATENT DOCUMENTS

| | | | |
|---|---|---|---|
| 6,882,847 B2 | 4/2005 | Craig et al. | |
| 7,068,631 B2 | 6/2006 | Eriksson et al. | |
| 7,120,201 B2 * | 10/2006 | Huang et al. | 375/267 |
| 7,327,798 B2 * | 2/2008 | Won | 375/267 |
| 7,339,981 B2 * | 3/2008 | Dogan | 375/219 |
| 7,646,820 B2 * | 1/2010 | Shen et al. | 375/260 |
| 7,720,161 B1 * | 5/2010 | Dogan et al. | 375/259 |
| 2002/0118771 A1 * | 8/2002 | Larsson | 375/267 |

(Continued)

OTHER PUBLICATIONS

3GPP TS 45.002 V7.2.0 (Nov. 2006), Technical Specification, 3rd Generation Partnership Project; Technical Specification Group GSM/EDGE Radio Access Network; Multiplexing and multiple access on the radio path (Release 7), Global System for Mobile Communications, 95 pages.

(Continued)

*Primary Examiner* — Qutbuddin Ghulamali
(74) *Attorney, Agent, or Firm* — Ronald O. Neerings; Frank D. Cimino

(57) ABSTRACT

Methods and apparatus to allocate reference signals in wireless communication systems are disclosed. A disclosed example method comprises applying a first cyclic shift to a first reference sequence during a first time interval, and applying a second cyclic shift to a second reference sequence during a second time interval, wherein the first and second cyclic shifts are members of a set of cyclic shifts assigned to devices of a wireless region.

13 Claims, 11 Drawing Sheets

(56) References Cited

U.S. PATENT DOCUMENTS

| | | | |
|---|---|---|---|
| 2006/0009227 A1* | 1/2006 | Cudak et al. | 455/450 |
| 2006/0026488 A1* | 2/2006 | Kim et al. | 714/758 |
| 2006/0126996 A1 | 6/2006 | Beshai | |
| 2006/0153282 A1 | 7/2006 | Jung | |
| 2006/0203932 A1* | 9/2006 | Palanki et al. | 375/295 |
| 2006/0222102 A1* | 10/2006 | Kadota | 375/295 |
| 2006/0274852 A1* | 12/2006 | Trachewsky et al. | 375/295 |
| 2007/0165588 A1* | 7/2007 | McCoy | 370/344 |

OTHER PUBLICATIONS

U.S. Appl. No. 11/627,035, filed Jan. 25, 2007, Tarik Muharemovic, Eko Onggosanusi, and Aris Papasakellariou, ,"Increasing the Number of Orthogonal Signals Using Block Spreading", 30 pages.

U.S. Appl. No. 11/461,982, filed Aug. 2, 2006, Tarik Muharemovic, Eko Onggosanusi, and Aris Papasakellariou, "Reference Signal Sequences and Multi-User Reference Signal Sequence Allocation", 41 pages.

3GPP TSG RAN WGl Meeting #48, St. Louis, USA, Feb. 12-16, 2007, R1-071109, "Sequence Allocation Method for E-UTRA Uplink Reference Signal", 3 pages.

TSG-RAN WG1 #48, St. Louis, USA, Feb. 12-16, 2007, R1-071030, "Uplink Reference signals", 2 pages.

3GPP TSG RAN1 #48, St. Louis, USA, Feb. 12-16, 2007, R1-070653, "CDM RS for Demodulation and Channel Sounding", 7 pages.

3GPP TSG RAN WG1 Meeting #48, St. Louis, USA, Feb. 12-16, 2007, R1-070748, "Cyclic-shift hopping for uplink sounding reference signal", 7 pages.

R1-071062: Uplink Reference Signal Planning Aspects, Agenda Item: 6.6.2, Motorola, 6 pages.

R1-070935: Uplink Reference Signal Hopping Comparison, Agenda Item: 6.6.2, Panasonic, NTT DoCoMo, TSG RAN WG1 Meeting #48, St. Louis, USA, Feb. 12-16, 2007, 15 pages.

\* cited by examiner

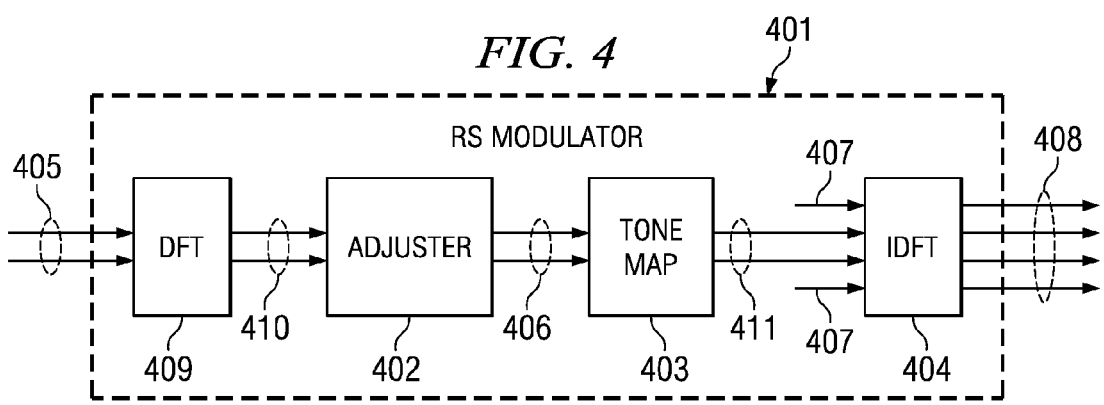
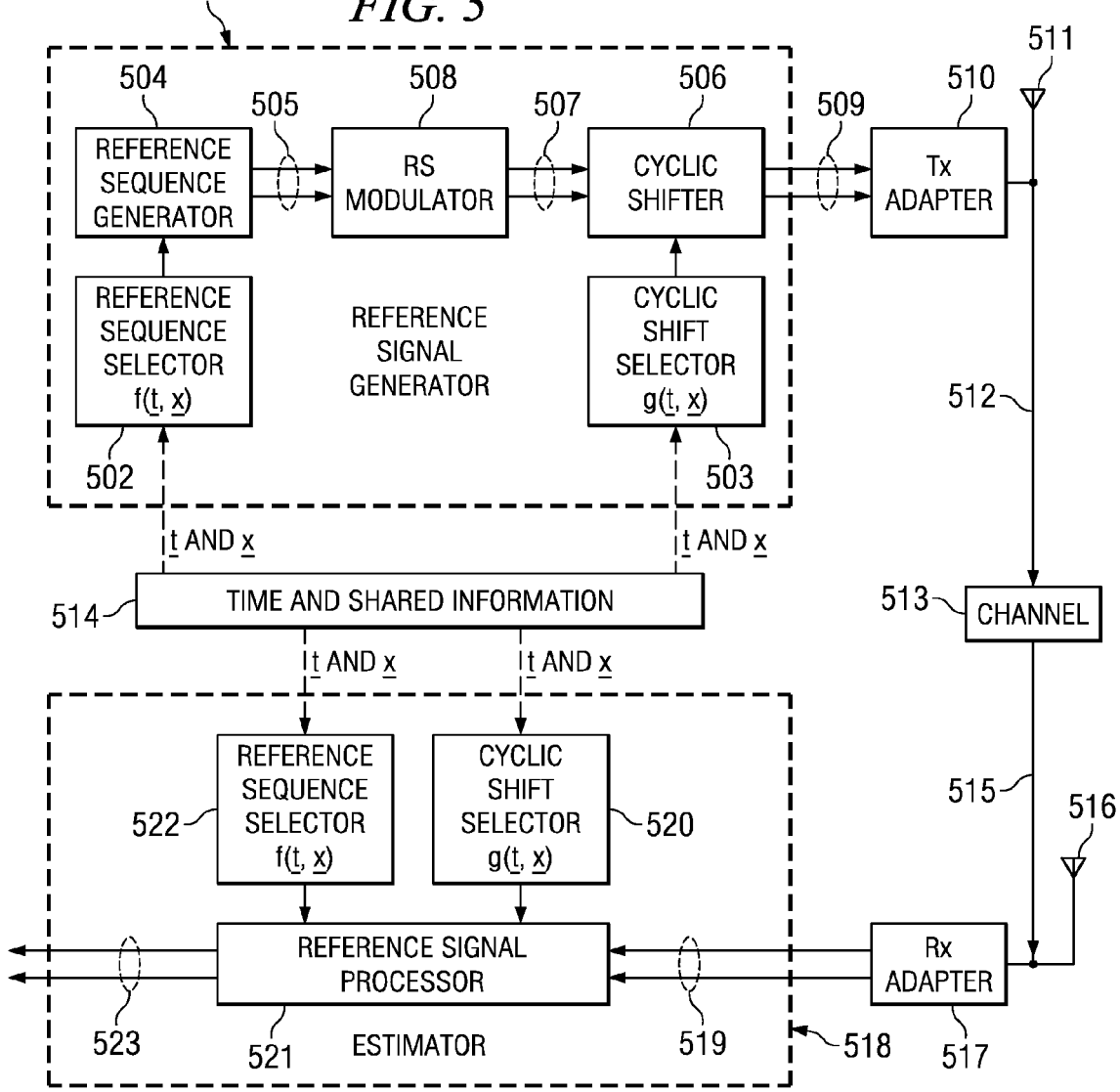

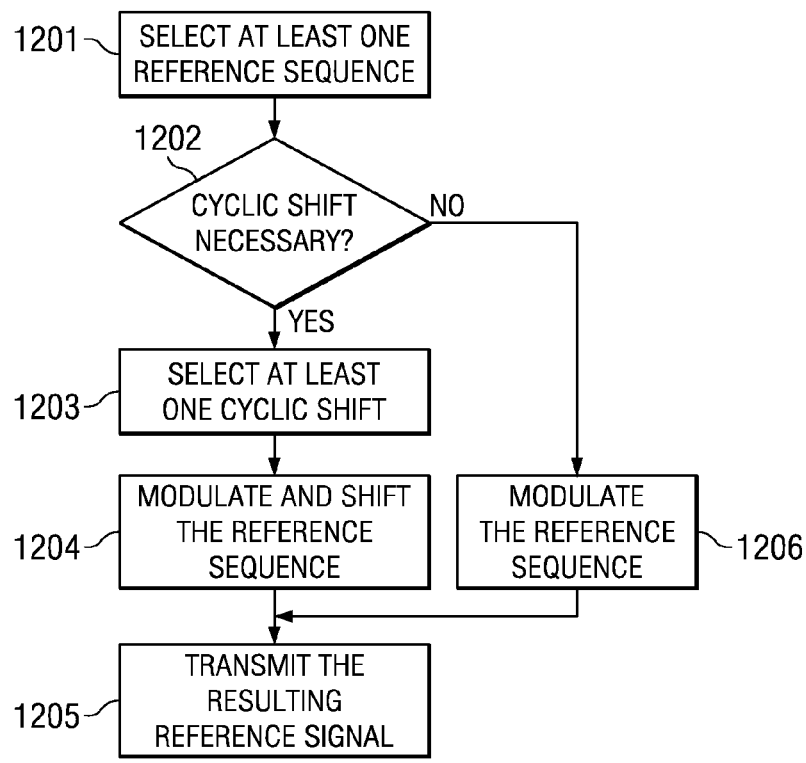
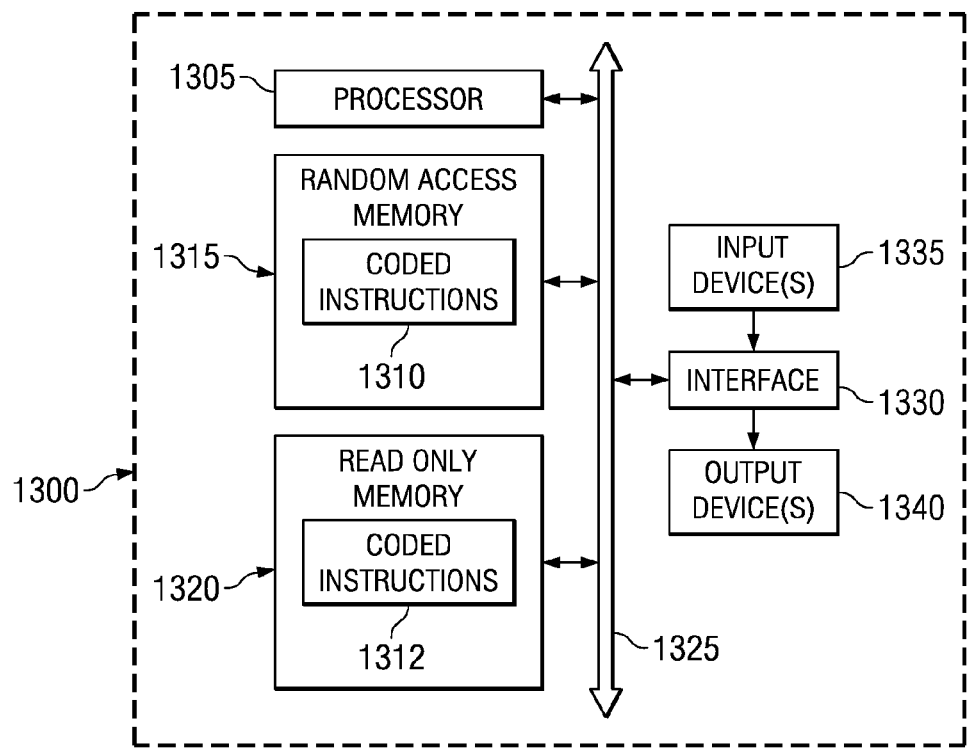

METHODS AND APPARATUS TO ALLOCATE REFERENCE SIGNALS IN WIRELESS COMMUNICATION SYSTEMS

RELATED APPLICATIONS

This patent claims priority from U.S. Provisional Application Ser. No. 60/745,820, entitled "Pilot Sequence Hopping in Wireless Communication Systems," filed on Apr. 27, 2006, and which is hereby incorporated by reference in its entirety.

FIELD OF THE DISCLOSURE

This disclosure relates generally to wireless communication systems, and, more particularly, to methods and apparatus to allocate reference signals in wireless communication systems such as cellular communication systems.

BACKGROUND

In many communication systems (e.g., a cellular communication system, a wireless communication system, a wireless local area network, etc.), a geographic area is divided into multiple regions (e.g., cells and/or sectors of cells). In a cellular communication system, each cell is served by an access point, which can be called the NodeB, the fixed station, the cell tower, or any other appropriate term. In turn, the system users utilize mobile equipment to communicate with a fixed station. This mobile equipment can be called the user equipment (UE), the mobile station (MS), the mobile terminal (MT), the user, or any other appropriate term. Example mobile UEs include a personal digital assistant (PDA), an MP3 player such as an iPod®, a wireless telephone (e.g., a cellular phone, a voice over Internet Protocol (VoIP) phone, a smart phone, etc.), a laptop computer with wireless communication capabilities (e.g., including a wireless modem card), etc. Examples of substantially stationary UEs include any personal computer (PC) with wireless communication capabilities. Each cell is associated with a corresponding serving NodeB, where the NodeB can serve multiple cells. To improve system performance, communication resources can be re-used across cells, where the re-use can be either "fractional re-use" or "full re-use," of communications resources. These resources can include frequencies, time-slots, signature codes, channels, reference signals, pilot signals, etc. Wireless systems, which employ a cellular re-use of communications resources, are typically called "cellular" communication systems. Transmitters and receivers can be simultaneously present in any given cell. In case of uplink (also known as "reverse link" or any other similar term) communication, transmitters are at UEs, and receivers are at NodeBs. In case of downlink (also known as "forward link" or any other similar term) communication, transmitters are at NodeB, and receivers are at the UE. In general, we will just refer to "transmitters" and "receivers."

Communication between transmitters and receivers occurs via signals. A signal can be designated as either a) "information-bearing signal," or alternatively, as b) a "reference signal," Furthermore, a signal may comprise a combination of one or more information-bearing signals and/or one or more reference signals. Information-bearing signals may comprise data or control signals, or a combination thereof. Information-bearing signals carry information from the transmitter to the receiver. In contrast, a "reference signal" (RS) is a signal which is revealed to both the transmitter and the receiver a-priori, and is therefore totally known by the receiver prior to any detection or estimation process. As such, the RS can be used for estimation of the communication medium (channel). The "reference signal" can also be termed as the "pilot signal", the "training signal," or any other similar term. Reference signals are used for: channel estimation, channel sounding, channel quality estimation, synchronization, timing-offset estimation, frequency-offset estimation, as carriers when modulated (with data or control info), or for any other purpose. Channel estimates, which are obtained from received reference signals, are used for data demodulation. Channel quality estimates, which are also obtained from received reference signals, can be used for purposes of user scheduling, link adaptation, power control, and/or other purposes.

BRIEF DESCRIPTION OF THE DRAWINGS

FIG. 4 is a diagram of another example Reference Signal (RS) Modulator.

FIG. 5 illustrates an example apparatus wherein common timing and shared information is used for assignment of reference signals and cyclic shifts to communication links.

FIG. 12 is a flowchart representative of example machine accessible instructions that may be executed to implement any or all of the Reference Signal Generators of FIGS. 1 and 2.

FIG. 13 is a schematic illustration of an example processor platform that may be used and/or programmed to execute the example machine accessible instructions of FIGS. 11 and/or 12 and/or to implement the example methods and apparatus to allocate reference signals described herein.

DETAILED DESCRIPTION

In practice, wireless communication signals are not confined by the boundaries of cells. As a result, the reuse of communication resources may result in interference between user endpoints located within different cells or between user endpoints located within the same cell. Furthermore, a persistent choice of the same reference signal by any given transmitter-receiver pair, may result in undesirable interference statistics (as seen by the neighbor transmitter-receiver pairs), because no interference averaging is achieved across time. This patent describes example methods and apparatus to allocate reference signals to transmitters which avoids such interference pitfalls. The terms "reference sequence" and "reference signal" may be used interchangeably. In some disclosed examples, a reference signal is a modulated, cyclically shifted, and/or transmitted version of a reference sequence. However, a reference signal may also refer to an un-modulated, un-shifted and/or un-transmitted signal. Thus, a reference signal and/or a reference sequence defines, specifies, represents and/or may be used to generate a signal transmitted by a UE and/or a NodeB during a reference signal, a pilot signal, a channel estimation, etc. time interval. The disclosed example methods and apparatus have particular applicability in orthogonal frequency division multiplexing (OFDM)-based systems, where the choice of reference signals with desirable properties is relatively scarce. These OFDM-based systems include, but are not limited to: OFDM, orthogonal frequency division multiple access (OFDMA), discrete Fourier transform (DFT)-spread OFDM, DFT-spread OFDMA, single carrier (SC)-OFDM, SC-OFDMA, multiple carrier (MC)-OFDM, MC-OFDMA, and others. It will be appreciated that the teachings of this patent are applicable beyond cellular systems, and can be applied in other applications such as, for example, wireless local area networks, mesh-networks, ad-hoc networks, and/or other wireless communication systems (e.g., CDMA and/or others).

Figure 1:
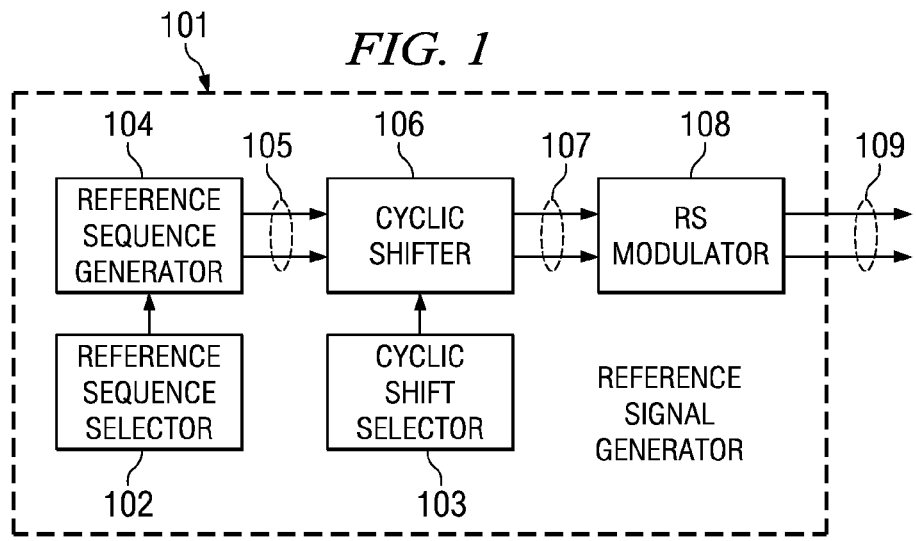
FIG. 1 is a diagram of an example Reference Signal Generator.
Figure 2:
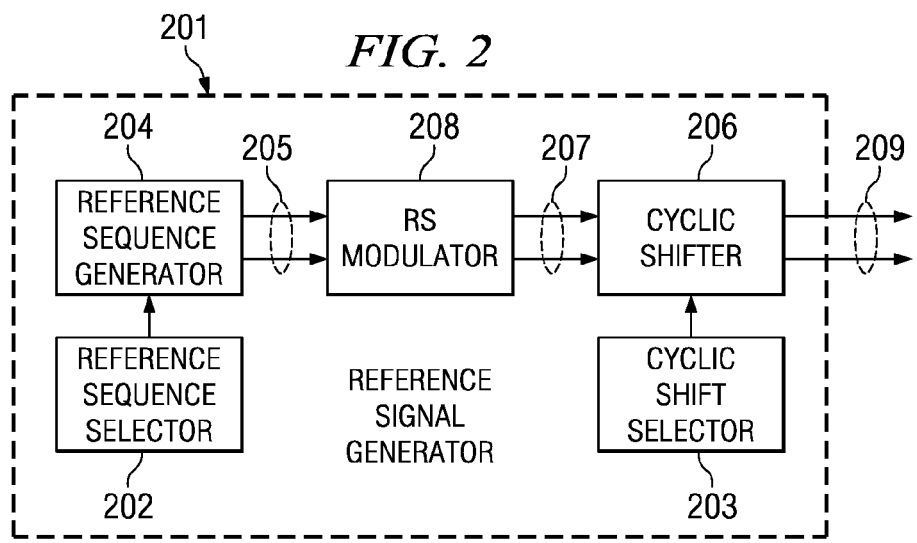
FIG. 2 is a diagram of another example Reference Signal Generator.

FIG. 1 and FIG. 2 illustrate two example RS reference signal generators. In the example of FIG. 1, the Reference Signal Generator in 101 comprises a Reference Sequence Selector 102, a Reference Sequence Generator 104, a Cyclic Shift Selector 103, a Cyclic Shifter 106, and an RS Modulator 108. The example Reference Signal Generator 101 operates as follows. The Reference Sequence Selector 102 selects which Reference Sequence shall be transmitted, from one or more predefined, generated, computed and/or random sets of Reference Sequences. The Reference Sequence Selector 102 then configures the Reference Sequence Generator 104, which produces the Reference Sequence 105. In general, a Reference sequence (e.g. the Reference sequence 105) is comprised of one or more elements (e.g., samples, bits and/or values) that are transmitted during a reference signal time period. The Cyclic Shift Selector 103 selects which cyclic shift (if any) from one or more predefined, generated, computed and/or random sets of cyclic shifts should be applied to the selected Reference Sequence 105. The Cyclic Shift Selector configures the Cyclic Shifter 106. The Cyclic Shifter 106 performs cyclic shifting of the Reference Sequence 105 (if enabled) to produce Cyclically Shifted Reference Sequence 107. As described below in connection with FIGS. 5 and 6, Reference Sequence(s) selected by the RS selector 102 and/or cyclic shifts (if any) selected by the cyclic shift selector 103 may be performed based on time and/or shared information, such as frame number, sub-frame offset, slot offset, NodeB identifier (NodeB ID), cell-group ID, UE ID, and/or a pseudo-noise generator seed. The Cyclically Shifted Reference Sequence 107 is passed to the RS Modulator 108, which further alters the Cyclically Shifted Reference Sequence 107 to produce Reference Signal 109. The RS Modulator 108 can be implemented by any modulator, including a modulator implemented in accordance with the Evolved Universal Terrestrial Radio Access (E-UTRA) specification currently being defined by Third Generation Partnership Project (3GPP) Technical Study Group (TSP) Radio Access Networks (RAN) Working Group 1 (WG1), code division multiple access (CDMA), OFDM, OFDMA, DFT-Spread OFDMA, DFT-Spread OFDM, the Institute of Electrical and Electronics Engineers (IEEE) 802.11x family of standards, wideband code division multiple access (WCDMA), time division multiple access (TDMA), and/or any combination thereof. Two different example implementations of the RS Modulator 108 are provided in FIG. 3 and FIG. 4. The Reference Signal 109 can be further adapted for wireless transmission.

The example Reference Signal Generator 201 of FIG. 2 comprises a Reference Sequence Selector 202, a Reference Sequence Generator 204, a Cyclic Shift Selector 203, a Cyclic Shifter 206, and an RS Modulator 208. The example Reference Signal Generator 201 of FIG. 2 operates as follows. The Reference Sequence Selector 202 selects which Reference Sequence shall be transmitted, from one or more predefined, generated, computed and/or random sets of Reference Sequences. The Reference Sequence Selector 202 then configures the Reference Sequence Generator 204, which produces the Reference Sequence 205. The Reference sequence 205 is comprised of one or more elements (e.g., samples, bits and/or values) that are transmitted during a reference signal time period. The Reference Sequence 205 is passed to the RS Modulator 208 which produces the Modulated RS Sequence 207. The Cyclic Shift Selector 203 selects which cyclic shift (if any) should be applied to the Modulated Reference Sequence 207, from one or more predefined, generated, computed and/or random sets of cyclic shifts. The Cyclic Shift Selector 203 configures the Cyclic Shifter 206. The Cyclic Shifter 206 performs cyclic shifting of the Modulated Reference Sequence 207 (if enabled) to produce the Reference Signal 209. As described below in connection with FIGS. 5 and 6, Reference Sequence(s) selected by the RS selector 202 and/or cyclic shifts (if any) selected by the cyclic shift selector 203 may be performed based upon time and/or shared information, such as frame number, sub-frame offset, slot offset, cell-(group) ID, Node B ID, UE ID, and/or a pseudo-noise generator seed. The RS Modulator 208 can be implemented by any modulator, including a modulator implemented in accordance with the E-UTRA specification currently being defined by 3GPP TSP RAN WG1, CDMA, OFDM, OFDMA, DFT-Spread OFDMA, DFT-Spread OFDM, the IEEE 802.11x family of standards, WCDMA, TDMA, and/or any combination thereof. Two different example implementations of the RS Modulator 208 are provided in FIG. 3 and FIG. 4. The Reference Signal 209 can be further adapted for wireless transmission.

While example RS generators 101 and 201 are illustrated in FIGS. 1 and 2, the RS generators 101 and 201 may be implemented using any number and/or type(s) of alternative and/or additional processors, devices, components, circuits, modules, interfaces, etc. Further, one or more of the processors, devices, components, circuits, modules, elements, interfaces, etc. illustrated in FIGS. 1 and/or 2 may be combined, re-arranged, eliminated and/or implemented in any other way. For example, the example reference signal generator 104 may be omitted and replaced and/or implemented by a memory and/or memory device storing pre-computed and/or pre-loaded reference signals. Moreover, the example RS selectors 102 and 202, the example cyclic shift selectors 103 and 203, the example RS generator 104 and 204, the example cyclic shifter 106 and 206, the example RS modulators 108 and 208 and/or, more generally, the example RS generators 101 and 201 may be implemented as any combination of firmware, software, logic and/or hardware. Moreover, the example RS generators 101 and 201 may include processors, devices, components, circuits, interfaces and/or modules instead of, or in addition to, those illustrated in FIGS. 1 and/or 2, and/or may include more than one of any or all of the illustrated processors, devices, components, circuits, interfaces and/or modules.

Figure 3:
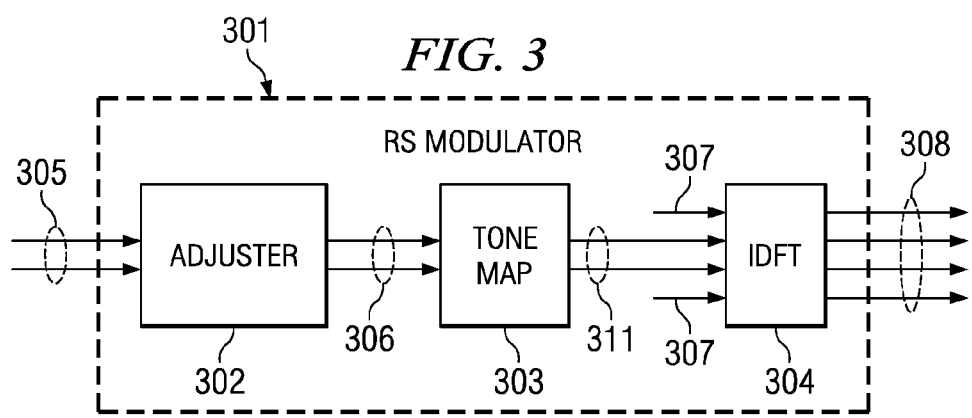
FIG. 3 is a diagram of an example Reference Signal (RS) Modulator.

As stated earlier, the RS Modulator (108 or 208) can be implemented as an OFDM(A) modulator. An example OFDM(A) modulator 301 is shown in FIG. 3. The example RS Modulator 301 of FIG. 3 comprises an Adjuster 302, a Tone Map 303, and an Inverse Discrete Fourier Transform (IDFT) 304. The example RS Modulator 301 of FIG. 3 is provided with Input Samples 305, which can be either the Cyclically Shifted Reference Sequence 107 or the Reference Sequence 205. The RS Modulator 301 operates as follows. The Input Samples 305 may first be adjusted by the Adjuster 302, because the length of the Input Samples may not match the allocated number of tones. The Adjuster 302 may perform any desired processing operation on the Input Samples 305, including, for example, truncation, block-repetition, DFT, permutation, cyclic extension, matrix multiplication, any other operation, and/or a combination thereof. The Adjusted Samples 306 are then passed to the Tone Map 303, which maps the Adjusted Samples 306 onto a designated set of IDFT input tones 311. The Tone Map can be arbitrary. For example, the Tone Map can be contiguous set of tones (e.g., using every tone starting from tone $w_1$ to tone $w_2$), or the Tone Map can be an evenly-spaced set of tones (e.g., using every V-th tone starting from tone $w_1$ to tone $w_2$). Other signals or zero padding (collectively and/or individually represented in FIG. 3 by 307) can be present at other IDFT inputs. The IDFT then transforms all of its input samples (311 and 307) to produce Output Samples 308, which are output by the RS Modulator 301. The IDFT may be implemented using one or more Fast Fourier Transform (FFT) algorithms.

As stated earlier, the RS Modulator (108 or 208) can be implemented by a DFT-Spread OFDM(A) modulator. An example DFT-Spread OFDM(A) modulator 401 is shown in FIG. 4. The RS Modulator 401 comprises an Adjuster 402, a Tone Map 403, an IDFT 404, and a Discrete Fourier Transform 409. The example RS Modulator 401 is provided with Input Samples 405, which can be either Cyclically Shifted Reference Sequence 107 or Reference Sequence 205. The RS Modulator 401 operates as follows. First, the Input Samples are transformed by the DFT 409 into Transformed Input Samples 410. Transformed Input Samples 410 may then be adjusted by the Adjuster 402, for example, because the length of the Input Samples may not match the allocated number of tones. The Adjuster 402 may perform any operation on the Transformed Input Samples 410, including, for example, truncation, block-repetition, DFT, permutation, cyclic extension, matrix multiplication, any other operation, and/or a combination thereof. The Adjusted Samples 406 are then passed to the Tone Map 403, which maps the Adjusted Samples 406 onto a designated set of IDFT input tones 411. The Tone Map can be arbitrary. For example, the Tone Map can be a contiguous set of tones (e.g., using every tone starting from tone $w_1$ to tone $w_2$), or the Tone Map can be an evenly-spaced set of tones (e.g., using every V-th tone starting from tone $w_1$ to tone $w_2$). Other signals or zero padding (represented collectively and/or individually by 407) can be present at other IDFT inputs. The IDFT then transforms all of its input samples (411 and 407) to produce Output Samples 408, which are output by the RS Modulator 401. The IDFT operation may be implemented using one or more Fast Fourier Transform (FFT) algorithms. In an alternate example, the operations of the Adjuster 402 and the DFT 409 can be interchanged, (i.e. Input Samples 405 are first adjusted with 402 and then the DFT 409 is applied).

While example RS Modulators 301 and 401 are illustrated in FIGS. 3 and 4, the RS Modulators 301 and 401 may be implemented using any number and/or type(s) of alternative and/or additional processors, devices, components, circuits, modules, interfaces, etc. For example, an RS Modulator 301, 401 may include a controller, a user data interface, a frame, a packetizer, a user data modulator, etc. Further, one or more of the processors, devices, components, circuits, modules, elements, interfaces, etc. illustrated in FIGS. 3 and/or 4 may be combined, re-arranged, eliminated and/or implemented in any other way. Moreover, the example adjusters 302 and 402, the example tone maps 303 and 403, the example IDFTs 304 and 404, the example DFT 409 and/or, more generally, the example RS Modulators 301 and 401 may be implemented as any combination of firmware, software, logic and/or hardware. Moreover, the example RS Modulators 301 and 401 may include processors, devices, components, circuits, interfaces and/or modules instead of, or in addition to, those illustrated in FIGS. 3 and/or 4, and/or may include more than one of any or all of the illustrated processors, devices, components, circuits, interfaces and/or modules.

Some examples utilize CAZAC sequences as the Reference Sequences (105 or 205 or 505 or 605). CAZAC sequences are complex-valued sequences with the following properties: 1) constant amplitude (CA), and 2) zero cyclic autocorrelation (ZAC). Examples of CAZAC sequences include (but are not limited to): Chu Sequences, Frank-Zadoff Sequences, Zadoff-Chu (ZC) Sequences, and Generalized Chirp-Like (GCL) Sequences. CAZAC (ZC or otherwise) sequences are presently preferred.

Zadoff-Chu (ZC) sequences, as defined by:

$$a_m(k)=\exp[j2\pi(m/N)[k(k+1)/2+qk]] \text{ for } N \text{ odd}$$

$$a_m(k)=\exp[j2\pi(m/N)[k^2/2+qk]] \text{ for } N \text{ even}$$

are representative examples of CAZAC sequences. An alternative convention of the ZC definition replaces "j" (complex unit) in the above formulas by "−j." Either convention can be adopted. For the representative CAZAC example, the formula was cited on page 53 from K. Fazel and S. Keiser, "Multi Carrier and Spread Spectrum Systems," John Wiley and Sons, 2003 (the Fazel and Keiser book is hereby incorporated herein by reference in its entirety). In the above formula, "m" and "N" are relatively prime, and "q" is any fixed integer (for example, q=0 is a good choice, because it simplifies computation as qk=0). Also, "N" is the length of the sequence, "k" is the index of the sequence element (k is from {0, 1, . . . , N−1}), and "m" is the index of the root ZC sequence. Making "N" a prime number maximizes the set of root ZC sequences having optimal cross-correlation. Thus, when "N" is prime, there are "(N−1)" possible choices for "m," where each choice results in a distinct root ZC CAZAC sequence. The terms: Zadoff-Chu, ZC, and ZC CAZAC, are commonly used interchangeably. The term CAZAC denotes any CAZAC sequence, like ZC, or otherwise.

In a preferred example, Reference Sequence (105 or 205 or 505 or 605) is constructed from a root constant amplitude zero autocorrelation ("CAZAC") sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and/or others. Thus, in the preferred example, a UE constructs the Reference Sequence from the available set of (N−1) root ZC CAZAC sequences. Cyclic Shifting is performed as follows: for any sequence [c(0) c(1) c(2) . . . c(M−1)], a corresponding cyclically shifted sequence is [c(s) c(s+1) c(s+2) . . . c(M−1) c(0) c(1) . . . c(s−1)], where "s" is the value of the cyclic shift. The Cyclic Shifting is performed by the cyclic shifter (106 or 206 or 506 or 606).

In an example transmitter, the Reference Sequence Selector 202 (or 102) selects the Reference Sequence 205 (or 105) index "m," and the Cyclic Shift Selector 203 (or 103) selects the Cyclic Shift "s," in accordance with $$m=f(\underline{t},\underline{x})$$

$$s=g(\underline{t},\underline{x})$$

Here, "f" and "g" denote functional dependencies. The Reference Sequence 205 can be selected from a collection of ZC CAZAC sequences. In the above equations, "$\underline{t}$" is a vector of information ($t_1$, $t_2$, $t_3$, $t_4$, etc.) which directly varies with time. For example, the vector "$\underline{t}$" may contain any or all of the system frame number ($t_1$), the sub-frame offset ($t_2$), slot offset ($t_3$), the transmitted symbol offset ($t_4$), and/or any other additional time-variant information ($t_5$, $t_6$, etc). The time-independent (or time semi-independent, which is slow-varying) information is found in the vector $\underline{x}$. For example, the vector "$\underline{x}$" ($x_1$, $x_2$, $x_3$, etc.) may contain any or all of cell (or cell-group) ID ($x_1$), the UE (or UE-group) ID ($x_2$), a pseudo-noise generator seed ($x_3$), NodeB ID ($x_4$), and/or any other time-invariant (or time semi-independent) information which is shared between the transmitter and the receiver ($x_5$, etc). For example, this other time-independent information can be IDs of some other UEs in the system (active or not), initial cyclic shift offset, or any other information. In this example, "f" and "g" can be any functions, and each component of described vectors ($\underline{x}$, and $\underline{t}$) can also be sub-vectors when considered stand-alone. For example, the function f($\underline{t}$, $\underline{x}$) may define and/or be implemented by a pseudo-random number generator (e.g. using linear-feedback shift registers). The shift register is initialized either by all or a portion of a NodeB ID, or by all or a portion of a Cell ID. The shift register is clocked $\alpha_1 t_1+\alpha_2 t_2+\alpha_3 t_3$ times (where $\alpha_1$, $\alpha_2$, and $\alpha_3$ are any constants), and the final content of the shift register defines and/or maps to an index m used to select and/or generate a Reference Sequence. Likewise, the function g($\underline{t}$, $\underline{x}$) may be implemented by a shift register, although with possibly different constants and/or using different inputs. For instance, a pseudo-random permutation generator implementing the function g($\underline{t}$, $\underline{x}$) may be initialized and/or offset using a NodeB ID, and/or using $\beta_1 t_1+\beta_2 t_2+\beta_3 t_3$ (where $\beta_1$, $\beta_2$ and $\beta_3$ are any constants that may be the same and/or different from the constants $\alpha_1$, $\alpha_2$ and $\alpha_3$). The result of the pseudo-random permutation generator is a permutation that is then applied to one or more pre-sorted Cell IDs that belong to the NodeB, and/or to one or more pre-sorted UE IDs that belong to the NodeB. One or more results of the applied permutation (permuted Cell IDs or permuted UE IDs) are then mapped onto a predetermined, computed and/or generated set of Cyclic Shifts "s," e.g., "s" is selected from {0, K, 2K, 3K, . . . , uK} of possible cyclic shifts and the result of the applied permutation, where K can be any integer. However, the functions f(t, x) and g(t, x) need not be implemented in the same way.

FIG. 5 illustrates an example transmitter-receiver pair constructed in accordance with the teachings of the invention. The example of FIG. 5 comprises a Reference Signal Generator 501, a transmit (Tx) Adapter 510, a Channel 513, a receive (Rx) Adapter 517, an Estimator 518, and Time and Shared Information 514. The example Reference Signal Generator 501 further comprises a Reference Sequence Selector 502, a Reference Sequence Generator 504, an RS Modulator 508, a Cyclic Shift Selector 503, and a Cyclic Shifter 506. The example Estimator 508 further comprises a Reference Sequence Selector 522, a Cyclic Shift Selector 520, and a Reference Signal Processor 521. In the example of FIG. 5, the Time and Shared Information 514 is shared/used between the transmitter (the Reference Signal Generator 501 is a transmitter component) and the receiver (the Estimator 518 is a receiver component). This Time and Shared Information 514 is represented by the two vectors $\underline{x}$ (shared-information), and $\underline{t}$ (time-information). Vectors $\underline{x}$ and $\underline{t}$ are revealed to both the transmitter and the receiver. This can be achieved through broadcasting, direct or indirect signaling, or by any other method of information sharing. Both the transmit Reference Signal Selector 502, and the receive Reference Sequence Selector 522 perform m=f($\underline{t}$, $\underline{x}$) to arrive at the common selected reference sequence. Both the transmit Cyclic Shift Selector 503 and the receive Cyclic Shift Selector 520 perform s=g($\underline{t}$, $\underline{x}$) to arrive at the common selected cyclic shift. Thus, at any given time, any given transmitter-receiver pair selects a common Reference Sequence and a common Cyclic Shift. In addition, the choice of selected Reference Sequence, and/or the Cyclic Shift, changes through time, for any given transmitter-receiver pair. This achieves interference randomization to adjacent communication links. Once the Reference Sequence Selector 502 selects the Reference Sequence and the Cyclic Shift Selector 503 selects the Cyclic Shift, the remainder of the transmission occurs as described earlier in FIG. 2. The Reference Sequence Generator 504 generates the reference sequence which is then modulated using the RS Modulator 508, whose output is then cyclically shifted by the Cyclic Shifter 506. The resultant Reference Signal 509 is then adapted for further transmission (e.g., using the Tx Adapter 510), which may involve cyclic prefix or guard time insertion, digital to analog conversion, up/down frequency conversion, any other operation, and/or a combination thereof. The Tx Adapter 510 can be equipped with at least one antenna 511 which sends the adapted Reference Signal over-the-air. The Adapted Reference Signal 512 undergoes channel changes (513) in the air, and is received (515) and adapted using the Rx adapter 517. One or more receiver antennas 516 can be components of the example Rx Adapter 517. The example Rx Adapter 517 may perform cyclic prefix or guard time removal/insertion, analog to digital conversion, up/down frequency conversion, any other operation, and/or a combination thereof. The Rx Adapter 517 passes the adapted samples 519 to the reference signal processor 521 which is equipped with the choice of the reference sequence (from the Reference Sequence Selector 522) and the choice of the cyclic shift (from the Cyclic Shift Selector 520). The Reference Signal Processor 521 processes samples 519 outputted from the Rx Adapter 517, and obtains relevant estimates 523. These relevant estimates 523 can be channel estimates, channel quality estimates, timing estimates, frequency-shift estimates, but can also be soft or hard estimates for data or control (when the RS is used as a carrier). Furthermore, relevant estimates 523 can also be any combination of described estimates, and/or any estimates of other and/or related quantities.

Figure 6:
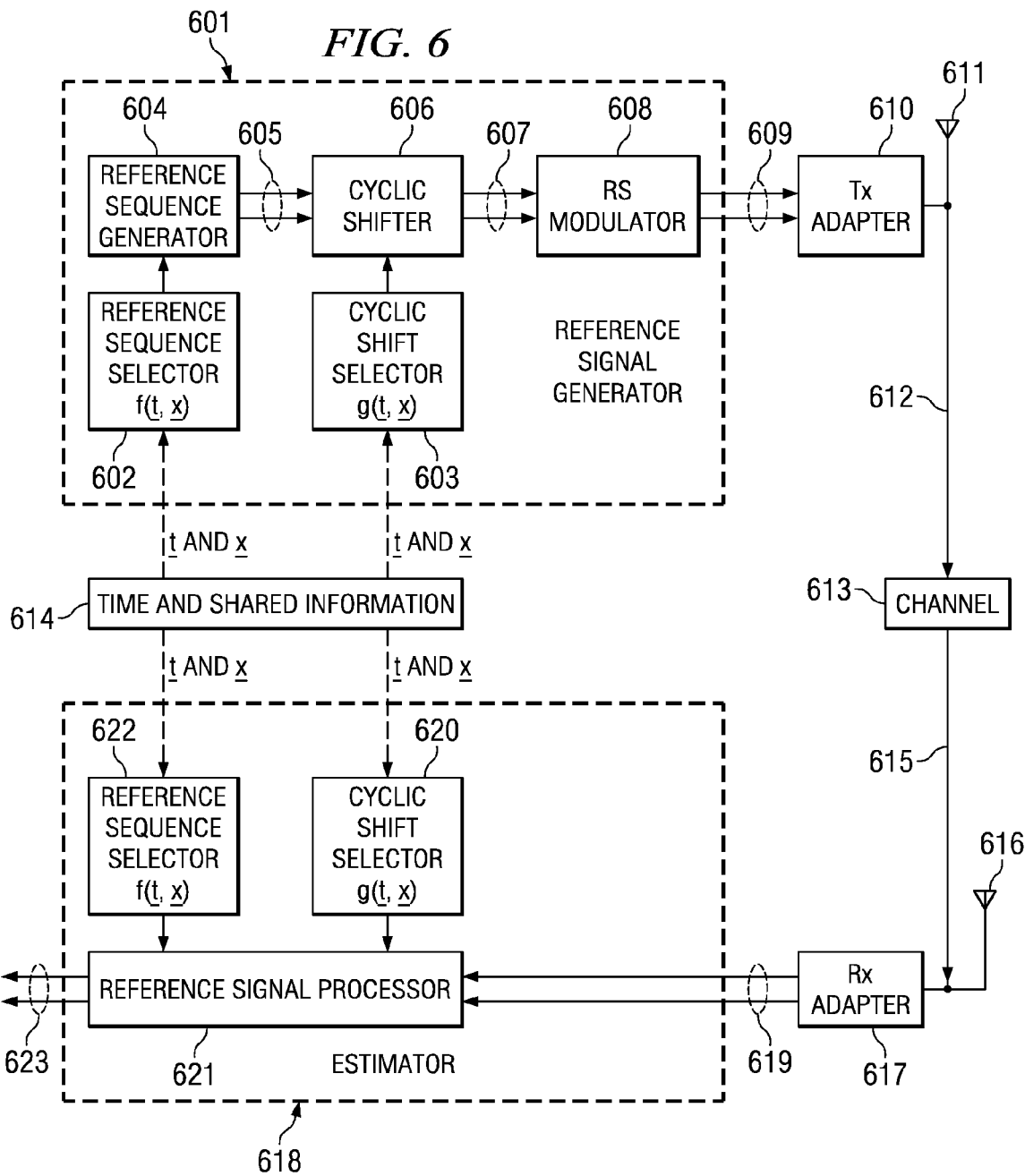
FIG. 6 illustrates another example apparatus wherein common timing and shared information is used for assignment of reference signals and cyclic shifts to communication links.

FIG. 6 illustrates another example transmitter-receiver pair constructed in accordance with the teachings of the invention. The example of FIG. 6 is similar to the example of FIG. 5, where the only modification is in the Reference Signal Generator 601. Unlike the example of FIG. 5, in the example Reference Signal Generator shown in FIG. 6, the Cyclic Shifter operation occurs prior to the RS Modulator operation. Selection of Reference Sequences m=f($\underline{t}$, $\underline{x}$) occurs as described above, both at the transmitter Reference Signal Selector and at the receiver Reference Signal Selector. Selection of the Cyclic Shifts s=g($\underline{t}$, $\underline{x}$) also occurs as described above, both at the transmitter Cyclic Shift Selector and the receive Cyclic Shift Selector. The example Sequence Generator 604 generates the reference sequence which is then cyclically shifted using Cyclic Shifter 606. The Cyclic Shifter output 607 is then modulated using the RS Modulator 608. The resultant Reference Signal 609, produced by the RS Modulator, is then adapted for further transmission (e.g., by the Tx Adapter 610), which may involve cyclic prefix or guard time insertion, digital to analog conversion, up/down frequency conversion, any other operation, and/or a combination thereof. The Tx Adapter 610 can be equipped with at least one antenna 611 which sends the adapted Reference Signal over-the-air. The remainder of the example apparatus of FIG. 6 (Channel, receiver, etc) operates like the example apparatus described in reference to FIG. 5.

While example communication systems are illustrated in FIGS. 5 and 6, the communication systems of FIGS. 5 and/or 6 can be implemented using any number and/or type(s) of alternative and/or additional processors, devices, components, circuits, modules, interfaces, etc. Further, one or more of the processors, devices, components, circuits, modules, elements, interfaces, etc. illustrated in FIGS. 5 and/or 6 may be combined, re-arranged, eliminated and/or implemented in any other way. Moreover, the example RS generators 501 and 601, the example Estimators 518 and 618, the example Transmit Adapter 510, the example Receive Adapter 517 and/or, more generally, the example communication systems may be implemented as any combination of firmware, software, logic and/or hardware. Moreover, the example communication systems of FIGS. 5 and/or 6 may include processors, devices, components, circuits, interfaces and/or modules instead of, or in addition to, those illustrated in FIGS. 5 and/or 6, and/or may include more than one of any or all of the illustrated processors, devices, components, circuits, interfaces and/or modules.

Figure 7:
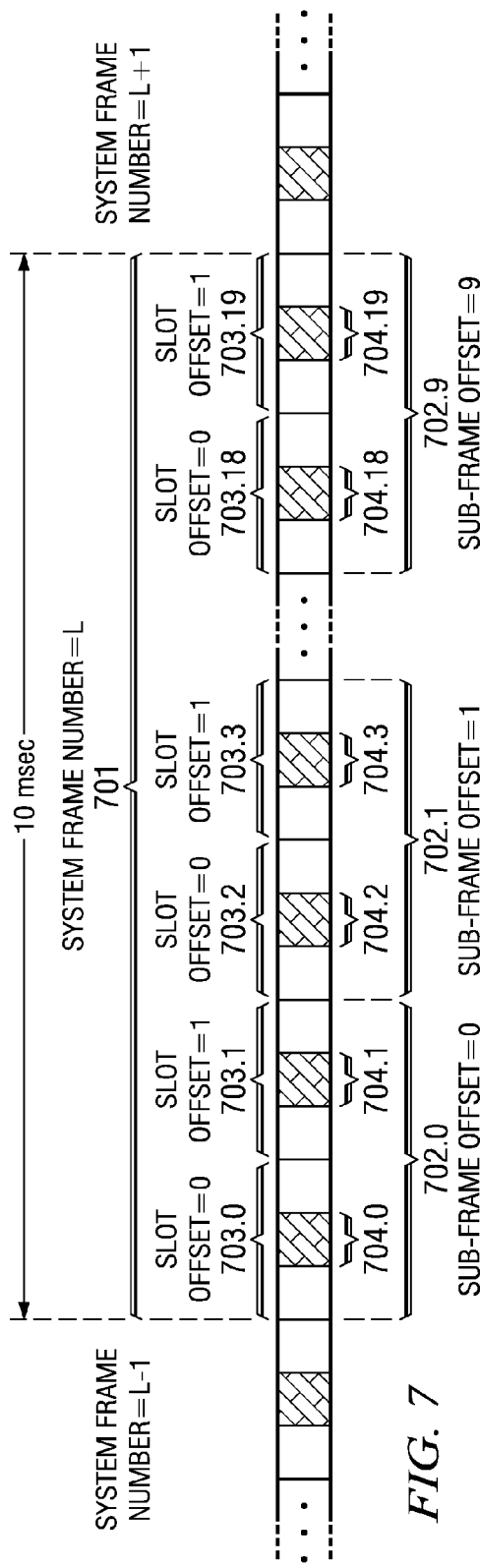
FIG. 7 illustrates an example partition of time used for assignment of reference signals.

FIG. 7 illustrates an example partition of time into units of System Frames (10 msec each), which are further divided into Sub-Frames (1 msec each), and which are further divided into slots (0.5 msec) each, as per working assumption in the EUTRA wireless standard. However, time may be partition into any units, frames, sub-frames and/or slots. Each slot has one reference signal (RS) placed in the middle of the slot. The remainder of each slot is reserved for data and uplink control transmission, which is performed using DFT-spread OFDM(A) modulation (outlined in FIG. 4 for RS). The Reference Signals are denoted as 704.0, 704.1, etc, 704.19. As shown in FIG. 7, the example time duration 701 has a System Frame Number value of $t_1$=L. A Time duration 701 is divided into multiple durations 702.0 (which has $t_1$=L, and Sub-Frame Offset $t_2$=0), 702.1 (which has $t_1$=L, and Sub-Frame Offset $t_2$=1), etc, and 702.9 (which has $t_1$=L, and Sub-Frame Offset $t_2$=9). The Time duration 702.0 is further partitioned into slot 703.0 (which has $t_1$=L, Sub-Frame Offset $t_2$=0, and Slot Offset $t_3$=0) and slot 703.1 (which has $t_1$=L, Sub-Frame Offset $t_2$=0, and Slot Offset $t_3$=1). The Time duration 702.1 is further partitioned into slot 703.2 (which has $t_1$=L, Sub-Frame Offset $t_2$=1, and Slot Offset $t_3$=0) and slot 703.3 (which has $t_1$=L, Sub-Frame Offset $t_2$=1, and Slot Offset $t_3$=1). Subsequent time durations 702.3-702.9 are similarly partitioned (e.g., time duration 702.9 is further partitioned into slot 703.18 (which has $t_1$=L, Sub-Frame Offset $t_2$=9, and Slot Offset $t_3$=0) and slot 703.19 (which has $t_1$=L, Sub-Frame Offset $t_2$=9, and Slot Offset $t_3$=1). Selection of Reference Signals and of Cyclic Shifts can partake on the order of Slots, Sub-Frames or System Frames. In case the selection of Reference Signals and Cyclic Shifts partakes on the order of System Frames, $t_2$ (Sub-Frame Offset) and $t_3$ (Slot Offset) are not used. In case that selection of Reference Signals and Cyclic Shifts partakes on the order of Sub-Frames, $t_3$ (Slot Offset) is not used. In case that selection of Reference Signals and Cyclic Shifts partakes on the order of Slots, all of $t_1$ (System-Frame Number), $t_2$ (Sub-Frame Offset) and $t_3$ (Slot Offset) are used. The System Frame Number is typically broadcast by the NodeB and decoded by the UE, whereas the rest of the timing is inferred from the System Frame Number, and the local time reference which counts Frames, Sub-Frames and Slots. An example of Cyclic-Shift selection which partakes on the order of Sub-Frames is s=K[(10$t_1$+$t_2$+$x_1$)mod P], where P can be any number.

In general, the selection functions f($\underline{t}$, $\underline{x}$) and g($\underline{t}$, $\underline{x}$), which are used for Reference Sequence Selection and for Cyclic Shift selection can be defined and implemented in any number of possible ways. These include a) algorithmic definitions, which involve computations of certain intermediate quantities, b) look-up tables, and/or c) a combination of a) and b). Look-up tables are the most general method of defining the selection functions, but are not always the most effective in terms of memory.

In some examples, the selection functions f($\underline{t}$, $\underline{x}$) and g($\underline{t}$, $\underline{x}$) are defined without any regard to the Network Topology. Here, due to the (randomized) nature of the selection of the Reference Sequence and of the Cyclic Shift, the likelihood of persistent co-channel interference is small, but not guaranteed to be zero.

In other examples, the selection functions f($\underline{t}$, $\underline{x}$) and g($\underline{t}$, $\underline{x}$) are defined by taking into account the Network Topology. The Network Topology is a map of the wireless network, which contains information about near-neighbors for each NodeB. When assigning the selection functions f($\underline{t}$, $\underline{x}$) and g($\underline{t}$, $\underline{x}$), care is utilized so that adjacent or near-by cells do not select a common value for the Reference Sequence and for the Cyclic Shift, on a common time-frequency resource. This can be achieved by a number of different methods some examples of which will now be explained with reference to FIG. 8.

Figure 8:
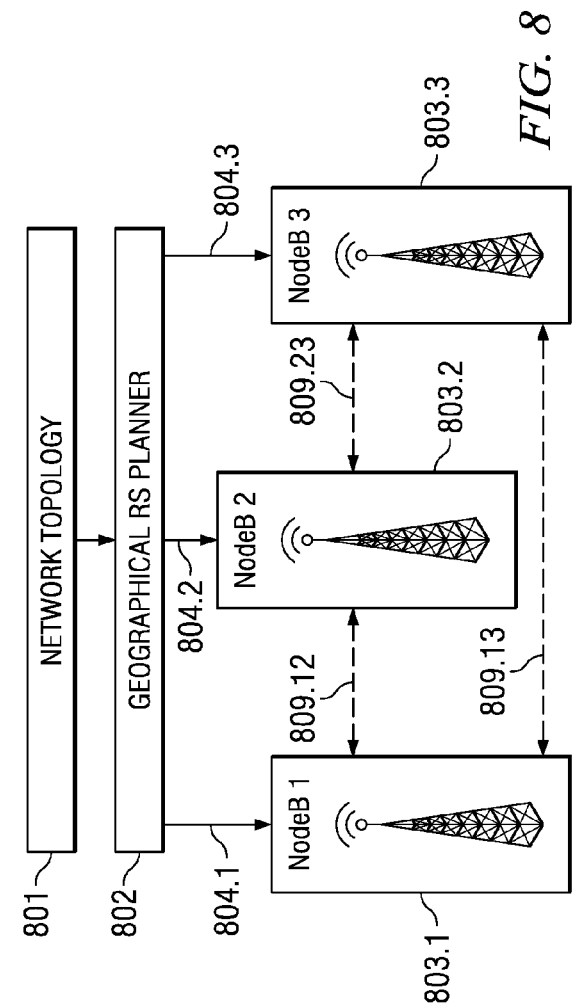
FIG. 8 illustrates an example apparatus for spatial planning of reference signals.
Figure 9:
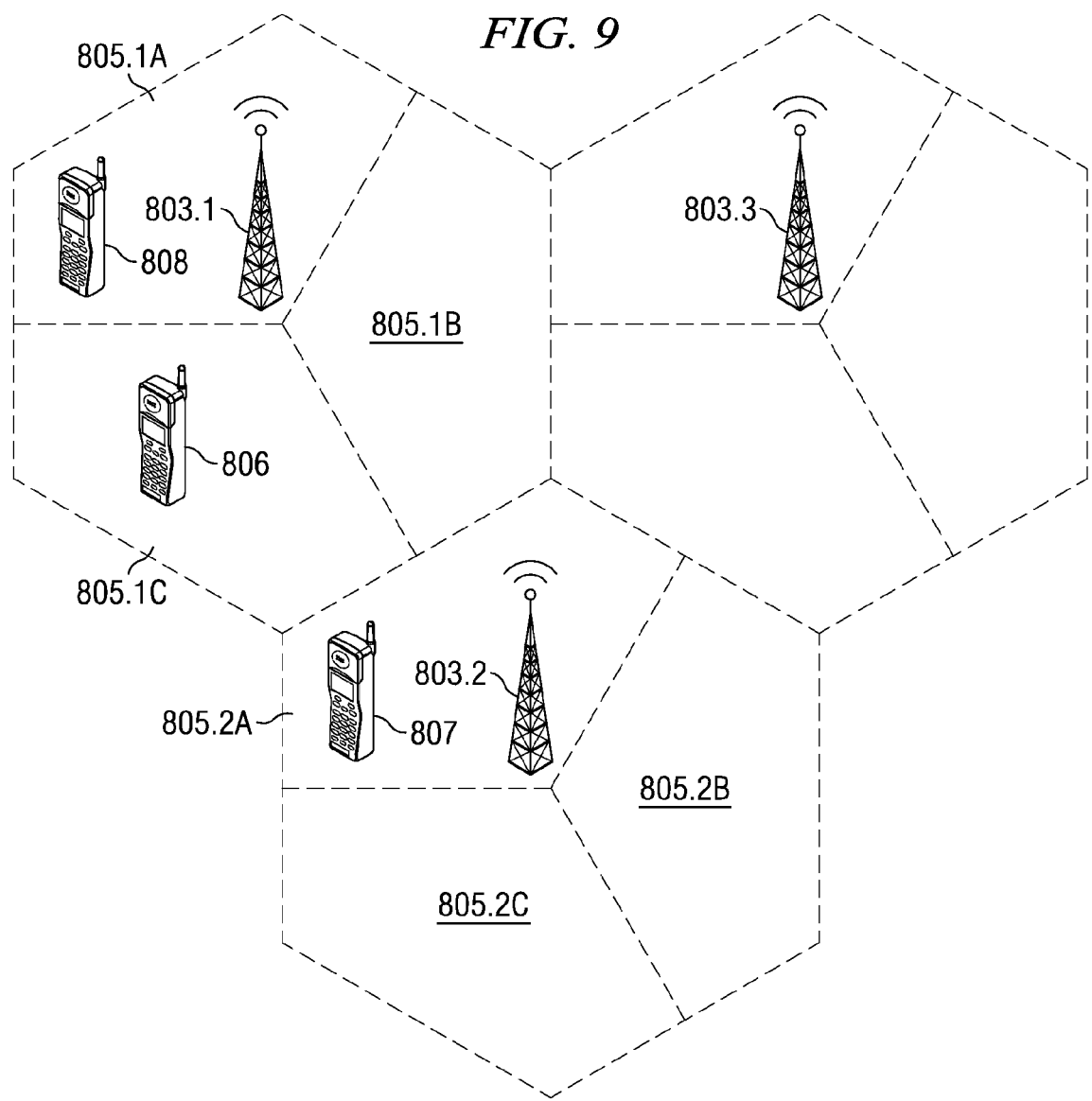
FIG. 9 illustrates an example system employing spatially planned reference signals.

In the examples of FIG. 8 and FIG. 9, the Network Topology information 801 is provided to the Geographical Reference Signal (RS) Planner 802. The Network Topology information may contain information on locations and proximities of NodeBs 803.1, 803.2, 803.3 (only these are shown in the diagram, but more may be included), etc. Furthermore, the Network Topology information 801 contains information on cells which are served by each NodeB. For example, as illustrated in FIG. 9, NodeB 803.1 serves cells 805.1A, NodeB 805.1B, and NodeB 805.1C. The example Geographical RS Planner 802 processes the Network Topology 801 and sends RS Configuration Messages to each NodeB. The example Geographical RS Planner 802 can be human, can be implemented by specialized software, and/or can be implemented by any other tool for assigning RS Configuration data and/or information to NodeBs. RS configuration data and/or information may be provided to and/or provisioned into the NodeBs via any protocol(s), messages(s) and/or technique(s). For example, the RS configuration data and/or information may be sent to the NodeBs using one or more RS Configuration messages and/or data packets, and/or may be downloaded directly into the NodeBs. Geographical RS Planner 802 may or may not be located inside the radio network controller (RNC). NodeB 803.1 is configured via RS Configuration Message 804.1, NodeB 803.2 is configured via RS Configuration Message 804.2, NodeB 803.3 is configured via RS Configuration Message 804.3, etc. Configuration messages 804 may or may not be implicitly tied (and determined) by the by CELL IDs (of that NodeB). RS Configuration Messages help each individual NodeB in determining how the selection of Reference Sequence and the Cyclic Shift is being performed, for communication with its serving UEs. For example, the Node B 803.1 communicates with UEs 808 (in cell 805.1A of FIG. 9) and 806 (in cell 805.1C). Simultaneously, the adjacent NodeB 803.2 communicates with UE 807. Configuration messages can influence the choice of f($t$, $x$) and/or g($t$, $x$) of inside each individual cell.

An example method for RS geographical planning, which may be performed by the example Geographical RS Planner 802, is to restrict a set of used Reference Sequences (and/or Cyclic Shifts) in each NodeB. This is performed by restricting the set of used reference sequence indexes "m". Here, the Geographical RS Planner 802 can ensure that adjacent cells (or adjacent NodeBs) never use a common Reference Sequence by assigning non-overlapping (sets of) Reference Sequences to adjacent NodeBs (or adjacent cells). This assignment is achieved through configuration messages 804. Consequently, the assignment functions f($t$, $x$) and g($t$, $x$) for the Reference Sequence and for the Cyclic Shift respectively, are preferably reflective of this restriction, within each cell. For example, to begin with, one or more assignment functions f($t$, $x$) and g($t$, $x$) can be generated, computed, selected and pre-stored inside each UE and/or NodeB. Then, each NodeB (possibly for each cell) broadcasts (or otherwise informs) to the UEs data and/or information specifying a restricted set of Reference Sequences and/or Cyclic Shifts. When Reference Sequence selection is performed by a UE and/or NodeB, the results of the assignment functions f($t$, $x$) and g($t$, $x$) are mapped onto indices of the restricted set of Reference Sequences and/or Cyclic Shifts. For example, if an assignment function f($t$, $x$) and/or g($t$, $x$) results in index (e.g., "m" and/or "s") that is not in the restricted broadcasted set, then the closest (according to some metric) index can be selected from the said restricted set. Thus, the final result of the assignment process reflects the said restriction. In other examples, the assignment function f($t$, $x$) may be independent from time information (it is fixed), whereas time-varying RS selection is performed using the Cyclic Shift assignment g($t$, $x$).

In other examples, common timing information is maintained through the cellular network. The Geographical RS planner 802 ensures that, for any given time-duration (e.g., Sub-Frame), the neighboring NodeBs (or neighboring cells) do not use a common selection of the Reference Sequence and the Cyclic Shift. As before, the final assignment functions f($t$, $x$) and g($t$, $x$) for the Reference Sequence and for the Cyclic Shift respectively, should be reflective of this restriction, within each cell.

In other examples, Network Topology 801, Geographical RS Planner 802, and the RS Configuration Messages 804 are unnecessary and omitted. In such examples, the cellular network is self-configuring, in terms of the RS, through inter-NodeB communication links. In reference to FIG. 8, these links are 809.12, 809.23, and 809.13. The inter-NodeB communication links, which are bi-directional, can be dedicated links, can be achieved through the internet back-bone, or can be any other communication links (wire-line or wireless). Thus, in such examples, geographically neighboring NodeBs communicate locally using the links 809, and negotiate possible restrictions on the set of used Reference Sequences and the set of used Cyclic Shifts. For example, in reference to FIG. 8, the NodeB 803.1 can occupy a set of at least one Reference Sequence, and it can inform the adjacent NodeBs about the set of Reference Sequences that it uses (or of its assignment functions f($t$, $x$) and g($t$, $x$)). The adjacent NodeBs, which are 803.2 and 803.3, then do not select their Reference Sequences from the set used by NodeB 803.1. These restrictions are then reflected through the final assignment functions f($t$, $x$) and/or g($t$, $x$) within each cell.

Figure 10:
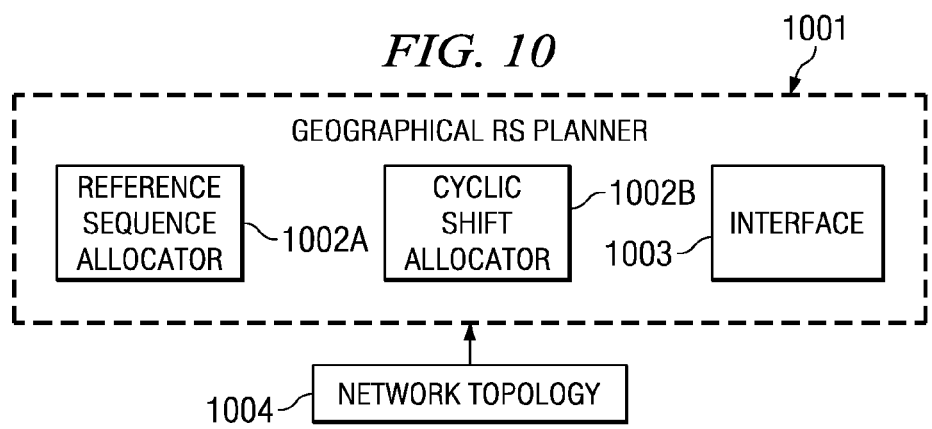
FIG. 10 illustrates an example geographical Reference Signal (RS) Planner.

FIG. 10 illustrates an example manner of implementing the Geographical RS Planner 802 of FIG. 8. The example Geographical RS Planner shown in FIG. 10 is labeled 1001. For each Grant Interval (e.g., decades, years, days, hours, minutes, seconds, frames, sub-frames), the example Geographical RS Planner 1001 allocates at least one Reference Sequence Index to each cell of each NodeB, which can contain active UEs. This allocation is performed using the Reference Sequence Allocator 1002A. The Grant Interval can be any pre-arranged time unit, such as decade, year, second, frame, sub-frame, any multiple thereof, or any other time unit. The Geographical RS Planner 1001 may perform this allocation in "real-time," and send configuration messages to cells, for each Grant Interval individually. Alternatively, the example Geographical RS Planner may pre-compute allocations of Reference Signal Indexes, for each Grant Interval in advance, and inform the NodeBs which it controls. In addition, the Geographical RS planner 1001 may contain a Cyclic Shift Allocator 1002B, which further allocates used cyclic shifts to each cell. The Cyclic Shift Allocation is also valid per Grant Interval, (i.e. different Grant Intervals can use different sets of cyclic shifts). The example RS allocator 1002A and the example Cyclic Shift Allocator 1002B use network topology information 1004 to generate and/or allocate the reference signals and/or cyclic shifts to each cell.

To provide the assignments, the example Geographical RS Planner 1001 of FIG. 10 includes any type of interface 1003. The example interface 1003 of FIG. 10 is communicatively coupled with the wireless base stations and is able to provide data and/or control words to the wireless base stations to program and/or configure them with their assignments (e.g., one or more values from which they may infer their Reference Sequence Assignment for each Grant Period). For example, as described above the Geographic RS Planner 1001 may send one or more RS Configuration Messages to provide the RS configuration data and/or information. Additionally or alternatively, the example interface 1003 may store the assignments in one or more machine accessible data structures (e.g., a configuration file) that may be transferred to and/or loaded in the wireless base stations.

While an example manner of implementing the example Geographical RS Planner 802 of FIG. 8 is illustrated in FIG. 10, the Planner 1001 may be implemented using any number and/or type(s) of alternative and/or additional processors, devices, components, circuits, modules, interfaces, etc. Further, one or more of the processors, devices, components, circuits, modules, elements, interfaces, etc. illustrated in FIG. 10 may be combined, re-arranged, eliminated and/or implemented in any other way. Additionally, the example Reference Sequence Allocator 1002A, the example Cyclic Shift Allocator 1002B, the example interface 1003 and/or, more generally, the said example Planner 1001 may be implemented as any combination of firmware, software, logic and/or hardware. Moreover, the example Planner 1001 may include processors, devices, components, circuits, interfaces and/or modules instead of and/or in addition to those illustrated in FIG. 10 and/or may include more than one of any or all of the illustrated processors, devices, components, circuits, interfaces and/or modules.

Figure 11:
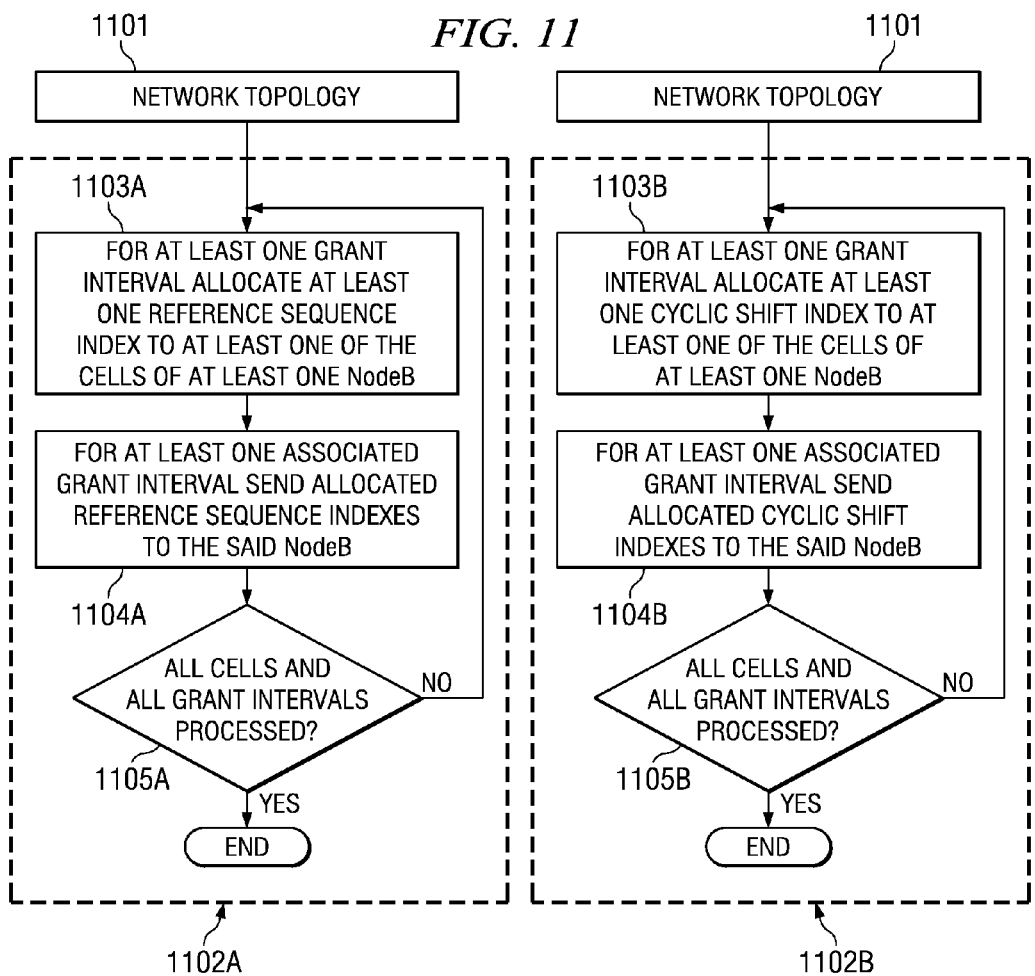
FIG. 11 contains flowcharts representative of example machine accessible instructions that may be executed to implement any or all of the example geographical Reference Signal (RS) Planner of FIGS. 9 and 10.

FIG. 11 are flowcharts representative of example machine accessible instructions that may be executed to implement any or all of the example Geographical RS Planners of FIG. 8 and FIG. 10. Also, FIG. 12 is a flowchart representative of example machine accessible instructions that may be executed to implement any or all of the example Reference Signal Generators. Any or all of example machine accessible instructions of FIG. 11 and/or FIG. 12 may be executed by a processor, a controller and/or any other suitable processing device. For example, the example machine accessible instructions of FIG. 11 and/or FIG. 12 may be embodied in coded instructions stored on a tangible medium such as a flash memory, ROM and/or RAM associated with a processor (e.g., the example processor 1305 discussed below in connection with FIG. 13). Alternatively, some or all of the example flowcharts of FIG. 11 and/or FIG. 12 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example flowcharts of FIGS. 11 and/or 12 may be implemented manually or as any combination(s) of any of the foregoing techniques, for example, any combination of firmware, software, discrete logic and/or hardware. Further, although the example machine accessible instructions of FIG. 11 and FIG. 12 are described with reference to the flowcharts of FIGS. 11 and 12, persons of ordinary skill in the art will readily appreciate that many other methods of implementing the example spatial planner 1001 and/or the example reference signal generator may be employed. For example, the order of execution of one or more of the blocks may be changed, and/or some of the blocks described may be changed, eliminated, sub-divided, and/or combined. Additionally, persons of ordinary skill in the art will appreciate that the example machine accessible instructions of FIGS. 11 and/or 12 may be carried out sequentially and/or carried out in parallel by, for example, separate processing threads, processors, devices, discrete logic, circuits, etc.

The example machine accessible instructions of FIG. 11 operate using the Network Topology information 1101. Two processes can occur in parallel, namely, the process: 1102A allocation (for at least one Grant Interval) of at least one Reference Sequence Index, and the process 1102B allocation (for at least one Grant Interval) of at least one Cyclic Shift. One or more of these allocations are communicated (block 1104A, and 1104B) to the appropriate NodeB. The spatial planner determines if all cells have been processed (blocks 1005A and 1105B). If not all cells have been processed, control returns to process the next cell. If all cells have been processed, control (blocks 1005A and 1105B) exits from the example machine accessible instructions of FIG. 11. Once the allocation for all Grant Intervals, and all cells is complete, the process can be terminated. Persons of ordinary skill in the art will readily appreciate that the example machine accessible instructions of FIG. 11 may be readily adapted for other implementations.

The example machine accessible instructions of FIG. 12 are executed for each reference signal time period, and begin with a Reference Sequence Selector selecting and/or identifying the Reference Sequence to be transmitted during the current Reference Signal Time Period (block 1201). If Cyclic Shifting is to be performed (block 1202), the Cyclic Shift Selector selects (block 1203) at least one Cyclic Shift to be applied to the process of modification of the Reference Sequence. The selected Reference Sequence is then modulated and cyclically shifted (but not necessarily in that order). If Cyclic Shifting is not necessary (block 1202), control proceeds to block 1206 where the Reference Sequence is modulated and then transmitted over the air.

FIG. 13 is a schematic diagram of an example processor platform 1300 that may be used and/or programmed to implement any portion(s) and/or all of the example Geographical RS Planner 802, and/or the example Reference Signal Generators 101, 201, 501 and 602, the example RS Modulators 301 and 401, the example Estimators 518 and 618, the example transmit adapters 510 and 610, the example receive adapters 517 and 617, the example Geographical RS Planners 802 and 1001 described herein, and/or the example machine accessible instructions of FIGS. 11 and 12. For instance, the processor platform 1300 can be implemented by one or more processors, processor cores, microcontrollers, DSPs, DSP cores, ARM processors, ARM cores, etc.

The processor platform 1300 of the example of FIG. 13 includes at least one programmable processor 1305. The processor 1305 executes coded instructions 1310 and/or 1312 present in main memory of the processor 1305 (e.g., within a RAM 1315 and/or a ROM 1320). The processor 1305 may be any type of processing unit, such as a processor core, a processor and/or a microcontroller. The processor 1305 may execute, among other things, the example machine accessible instructions of FIG. 11 and/or FIG. 12 to implement any or all of the example of the Geographical RS Planner 802 and/or the example Reference Signal Generator 101 (from FIG. 1), 201 (from FIG. 1), 501 (from FIG. 1), 601 (from FIG. 1), and/or the example receiver 518 (from FIG. 5) and 618 (from FIG. 6), described herein. The processor 1305 is in communication with the main memory (including a ROM 1320 and/or the RAM 1315) via a bus 1325. The RAM 1315 may be implemented by DRAM, SDRAM, and/or any other type of RAM device, and ROM may be implemented by flash memory and/or any other desired type of memory device. Access to the memory 1315 and 1320 may be controlled by a memory controller (not shown). The RAM 1315 may be used to store and/or implement, for example, the said example or Reference Sequences, or the said example of lookup table implementation of assignment functions f($t$, $\underline{x}$) and/or g($t$, $\underline{x}$).

The processor platform 1300 may include an interface circuit 1330. The interface circuit 1330 may be implemented by any type of interface standard, such as a USB interface, a Bluetooth interface, an external memory interface, serial port, general purpose input/output, etc. One or more input devices 1335 and one or more output devices 1340 are connected to the interface circuit 1330. The input devices 1335 and/or output devices 1340 may be used to provide either (indexes of) Reference Sequences, or Reference Sequence Permutation Assignments, or the assignment functions f($t$, $\underline{x}$) and/or g($t$, $\underline{x}$), to wireless base stations, and/or to send and/or received time and/or shared information 514 and/614.

Figure 14:
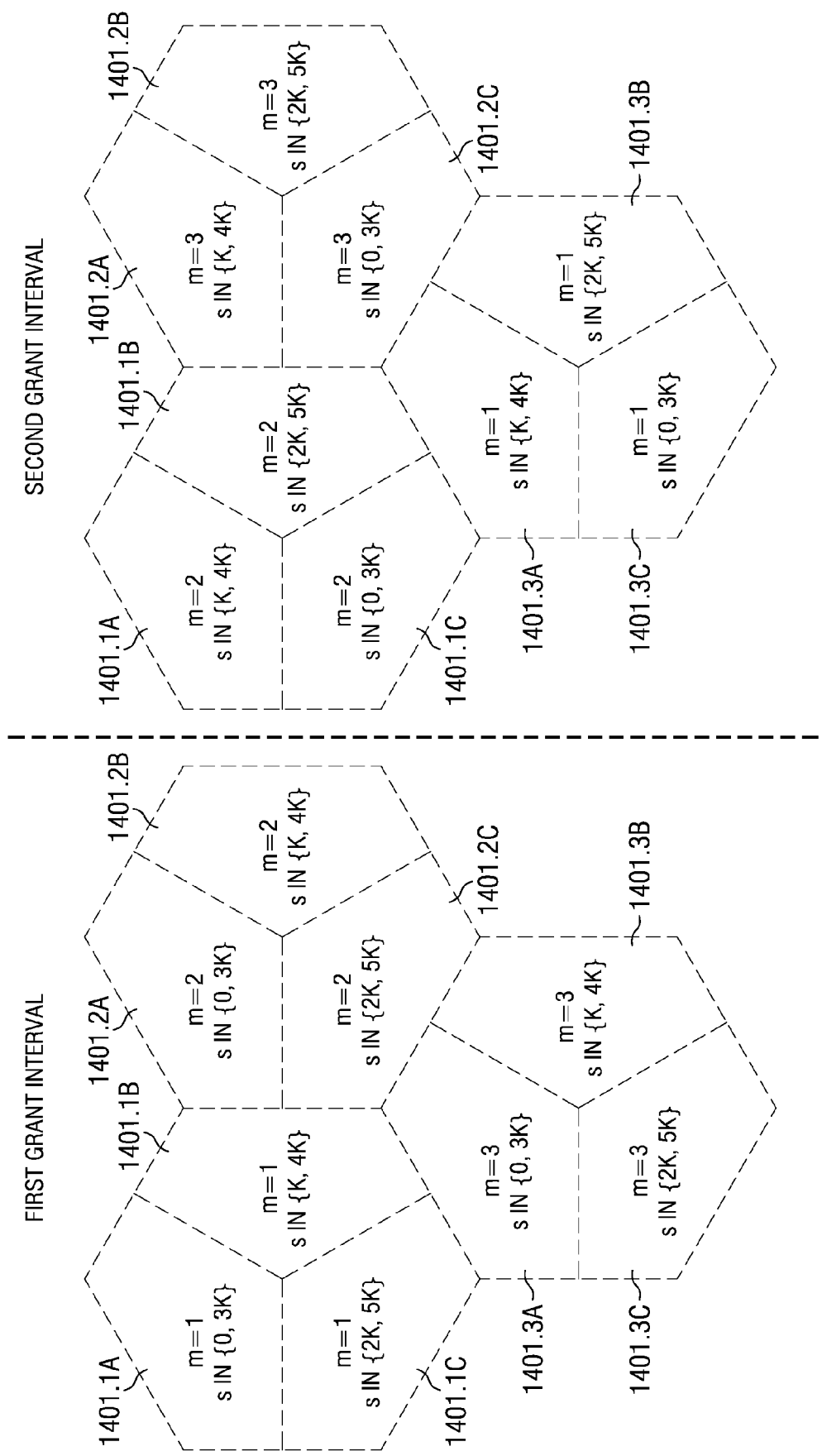
FIGS. 14, 15, 16, 17, 18, 19 and 20 illustrate example allocations of reference signals to wireless regions.

FIG. 14 illustrates an example cellular network comprising cells 1401.1A, 1401.1B and 1401.1C (served by first NodeB), cells 1401.2A, 1401.2B and 1401.2C (served by second NodeB), and cells 1401.3A, 1401.3B and 1401.3C (served by third NodeB). The cellular network is shown for two consecutive Grant Intervals. In the first Grant Interval, UEs in cell 1401.1A use Reference Sequence with index m=1, and Cyclic Shifts of 0 and 3K. Here, Cyclic Shift 0 means that no Cyclic Shifting is necessary, and Cyclic Shift "nK" means that the signal should be shifted by "n*K" samples, bit and/or values, where K is any pre-determined integer that may, in some examples, depend on the length of the Reference Sequence. In the second grant interval, the UEs in 1401.1A use Reference Sequence with index m=2, and Cyclic Shifts of K and 4K. For example, a UE inside the cell 1401.1A can transmit a first Reference signal defined by "m=1" and a Cyclic Shift "s=3K" during any portion of a first Grant Interval, and transmit a second Reference signal defined by "m=1" and a Cyclic Shift "s=0" during another portion of the first Grant Interval. Furthermore, the UE can transmit a third Reference signal defined by "m=2" and a Cyclic Shift "s=4K" during any portion of a Second Grant Interval, and a fourth Reference signal defined by "m=2" and a Cyclic Shift "s=K" during another portion of the Second Grant Interval. For example, in reference to FIG. 6, the Reference Sequence Selector 602 selects, generates and/or computes "m=1", and the Cyclic Shift Selector 603 selects, generates and/or computes "s=3K" during a portion of the First Grant Interval. The cellular network in FIG. 14 thus employs both hopping of the Reference Sequence and of the Cyclic Shift. FIG. 14 can represent either randomized or geographically planned hopping, or a combination thereof.

Figure 15:
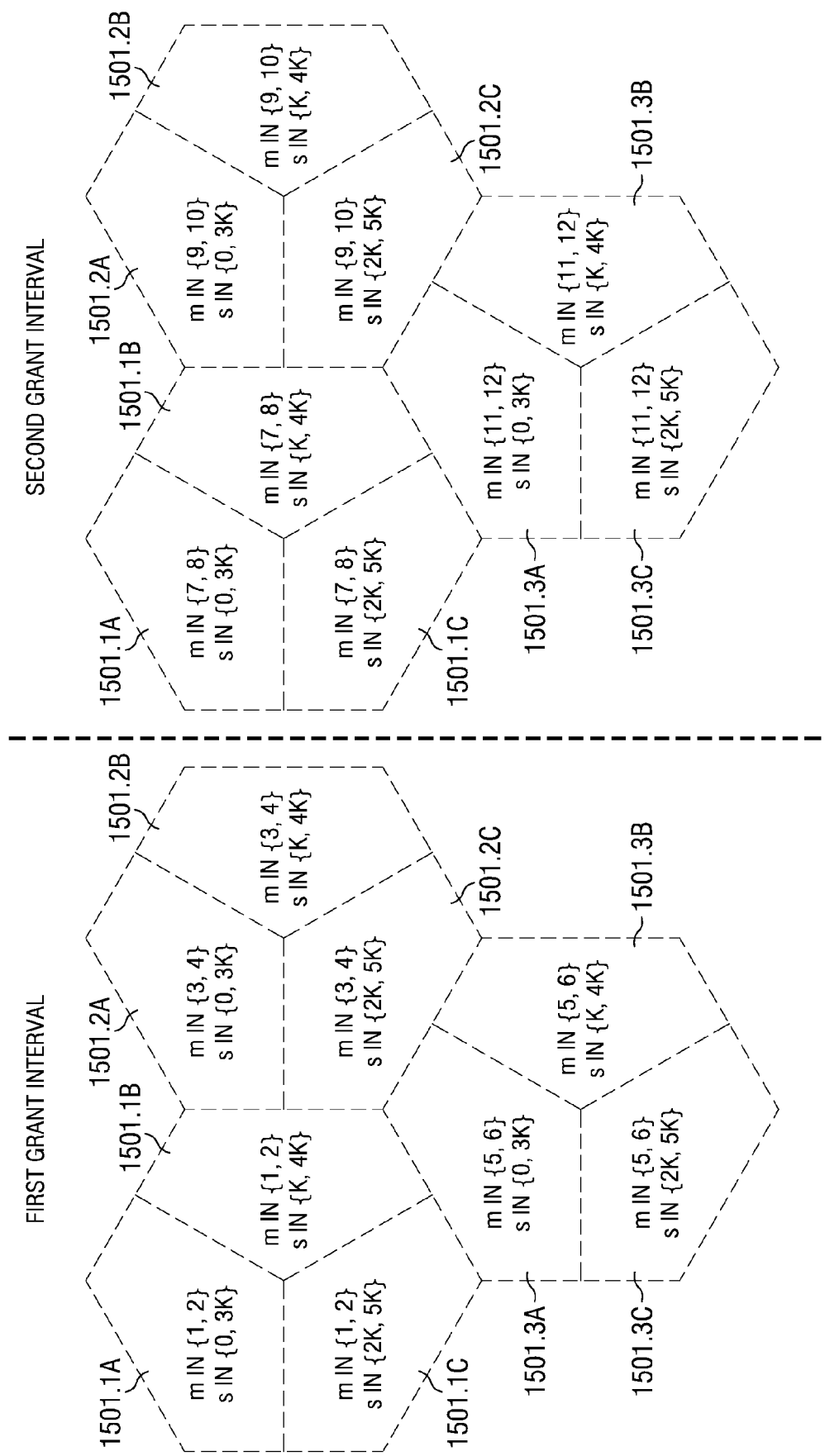

FIG. 15 illustrates an example cellular network comprising cells 1501.1A, 1501.1B and 1501.1C (served by first NodeB), cells 1501.2A, 1501.2B and 1501.2C (served by second NodeB), and cells 1501.3A, 1501.3B and 1501.3C (served by third NodeB). The cellular network is shown for two consecutive Grant Intervals. In the first Grant Interval, UEs in cell 1501.1A use Reference Sequence with indexes m from 1 and 2, and Cyclic Shifts of 0 and 3K. In the second grant interval, the UEs in 1501.1A use Reference Sequence with indexes m from 7 and 8, and Cyclic Shifts of 0 and 3K. For instance, a UE inside the cell 1501.1A can transmit a first Reference signal defined by "m=1" and a Cyclic Shift "s=3K" during any portion of the first Grant Interval, and can transmit a second Reference signal defined by "m=1" and a Cyclic Shift "s=3K" during another portion of the first Grant Interval. Furthermore, the UE can transmit a third Reference signal defined by "m=7" and a Cyclic Shift "s=3K" during any portion of a Second Grant Interval, and a fourth Reference signal defined by "m=8" and a Cyclic Shift "s=3K" during another portion of the Second Grant Interval. For example, in reference to FIG. 6, the Reference Sequence Selector 602 selects, generates and/or computes "m=1", and the Cyclic Shift Selector 603 selects, generates and/or computes "s=3K" during a portion of the First Grant Interval. The cellular network in FIG. 14 thus employs hopping of the Reference Sequence.

Figure 16:
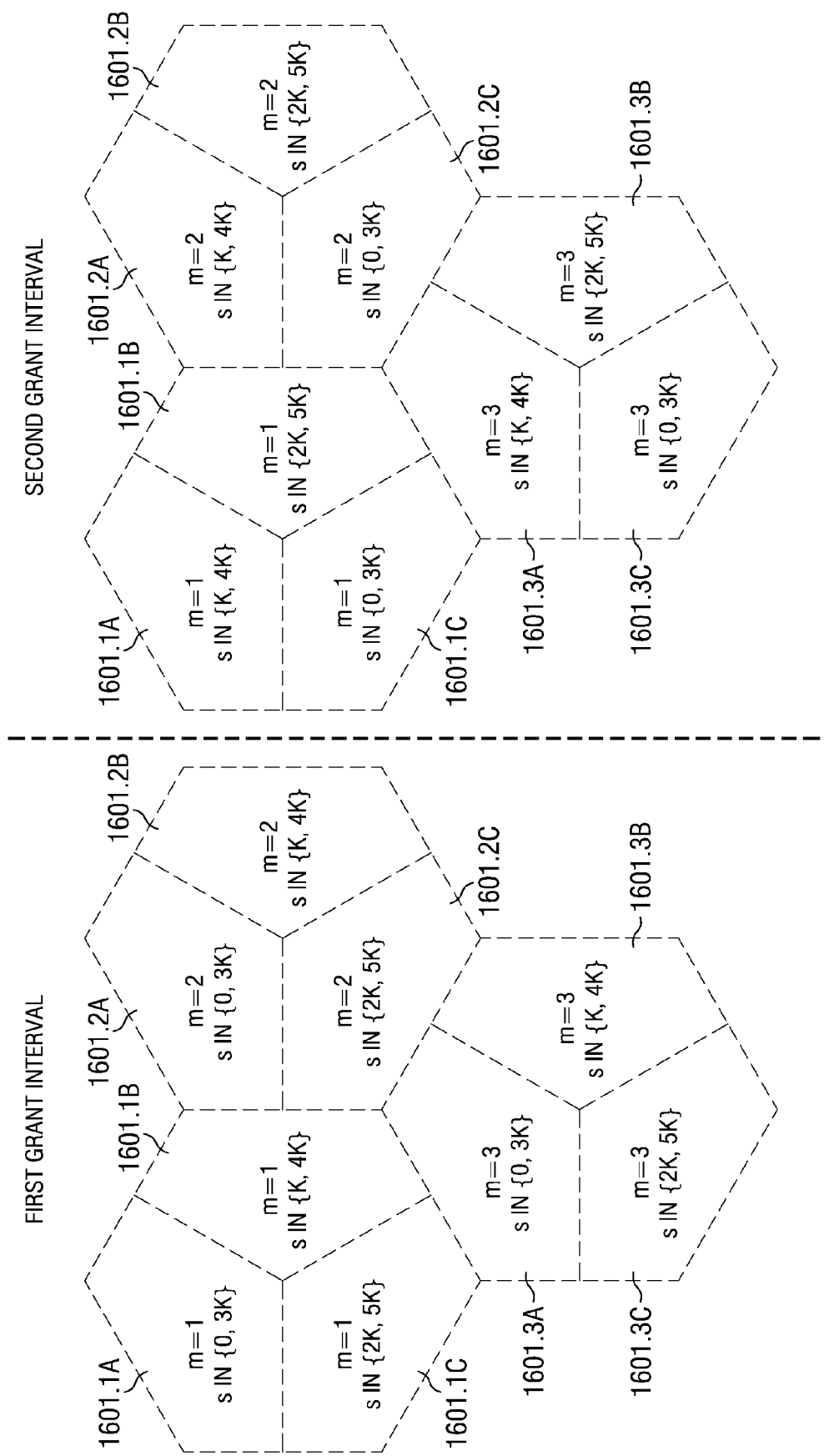

FIG. 16 illustrates an example cellular network comprising cells 1601.1A, 1601.1B and 1601.1C (served by first NodeB), cells 1601.2A, 1601.2B and 1601.2C (served by second NodeB), and cells 1601.3A, 1601.3B and 1601.3C (served by third NodeB). The cellular network is shown for two consecutive Grant Intervals. In the first Grant Interval, UEs in cell 1601.1A use Reference Sequence with index m=1, and Cyclic Shifts of 0 and 3K. In the second grant interval, the UEs in 1601.1A use Reference Sequence with index m=1, and Cyclic Shifts of K and 4K. For instance, a UE inside cell the 1601.1A can transmit a first Reference signal defined by "m=1" and a Cyclic Shift "s=3K" during any portion of a first Grant Interval, and can transmit a second Reference signal defined by "m=1" and a Cyclic Shift "s=0" during another portion of the first Grant Interval. Furthermore, the UE can transmit a third Reference signal defined "m=2" and a Cyclic Shift "s=4K" during any portion of a Second Grant Interval, and a fourth Reference signal defined by "m=1" and a Cyclic Shift "s=K" during another portion of the Second Grant Interval. For example, in reference to FIG. 6, the Reference Sequence Selector 602 has selects, generates and/or computes "m=1", and the Cyclic Shift Selector 603 selects, generates and/or computes "s=3K" during a portion of the First Grant Interval. The cellular network in FIG. 16 thus employs hopping of the Cyclic Shift. FIG. 16 can represent either randomized or geographically planned hopping, or a combination thereof.

As used herein, the phrase "spatially-planned chain of Reference Lists" refers to one or more Lists of Reference Sequences (where each non-empty list contains and/or identifies at least one Reference Sequence) which are assigned to different wireless regions (e.g., communication cells and/or sectors) based on their physical location relative to nearby regions. Each List of Reference Sequences is allocated and/or assigned to a wireless region, for duration of at least one Grant Interval. For example, in FIG. 15, a List is of Reference Sequences with indexes {1, 2} allocated and/or assigned to region 1501.1A for the First Grant Interval, and a List {7, 8} allocated and/or assigned to the same region 1501.1A for the Second Grant Interval. Thus, the appropriate chain of Reference Lists allocated to region 1501.1A is [{1, 2} {7, 8}]. Different chains of Reference Lists are assigned to different wireless regions (e.g., communication cells and/or sectors), based on their physical location relative to nearby regions. Thus, the term "chain of Reference Lists," as used herein, refers to an ordered chain of lists of Reference Sequences, where a first list in the chain is used during a first Grant Interval and the next list from the chain is used during a second Grant Interval. Cyclic Shifts may likewise be defined and/or specified by chains of Shifts Lists that are constructed to those described above for Reference Sequences. Moreover, Cyclic Shifts and Reference Sequences may be defined and/or specified using a chain of Lists that includes both Cyclic Shifts and Reference Sequences.

Figure 17:
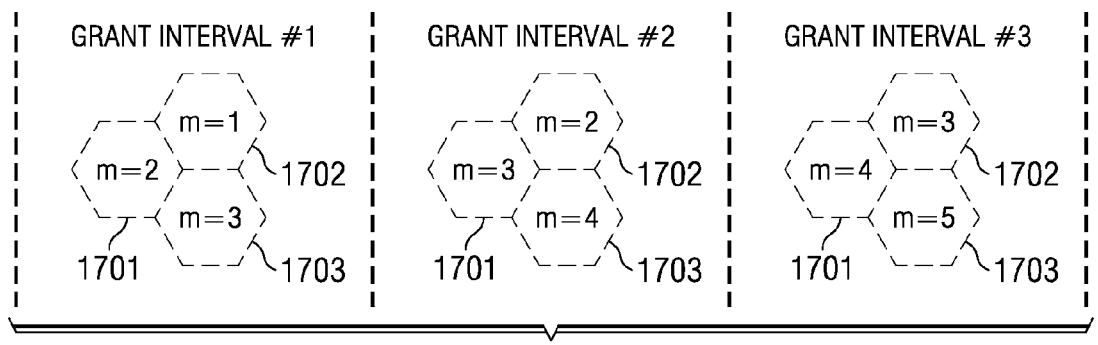

FIG. 17 illustrates an example where each Reference List identifies only one reference sequence. The chain of Reference Lists allocated to wireless region 1701 is [{2} {3} {4}], the chain of Reference Lists allocated to wireless region 1702 is [{1} {2} {3}], and the chain of Reference Lists allocated to wireless region 1702 is [{3} {4} {5}]. Thus, the example wireless region 1701 uses Reference Sequences in an ordered chain P1: [m=2, m=3, m=4], as shown in FIG. 17. Likewise, the example wireless region 1702 uses Reference Sequences in an ordered chain P2: [m=1, m=2, m=3], and the example wireless region 1703 uses Reference Sequences in an ordered chain P3: [m=3, m=4, m=5]. In some examples, when a device reaches the end of its chain of Reference Lists, it continues transmitting using Reference Lists from the beginning of its ordered chain. Because chains of Reference Lists P1, P2, etc. are chosen so that the cross-correlations of each pair of the Reference Sequences contained in a Reference List for any given Grant Interval are substantially zero, the transmission of reference signals within the regions according to different chain of Reference Lists substantially reduces interference between the example devices of the example regions 1701-1703. While chains are assigned to NodeBs controlling regions 1701-1703 in the example of FIG. 17, persons of ordinary skill in the art will readily appreciate that chains may likewise be assigned to cells (or sectors) of a NodeB (e.g., see FIGS. 13-15 and/or FIGS. 18-20). Ordered chains of Reference Lists may also be used in the downlink as well.

Different chains of Reference Lists, assigned to different wireless regions, are constructed from the set of all available Reference Sequence indexes. That is, each chain of Reference Lists can represent the transmission of Reference Sequences in a different order. In some examples, chains of Reference Lists can impose a restriction on the final assignment functions f(t x) and/or g(t x). However, reference chains of Reference Lists may be defined and/or specified in any way. For example, each Reference List can be empty, or can contain one or more indices. Furthermore, each chain of Reference Lists may or may not contain all Reference Sequence indices. Different Reference Lists from the same or different chains need not contain the same number of Reference Sequences, etc. Reference Sequences themselves need not be specified in a sequential order. Moreover, two geographically separated regions (e.g., non-adjacent and/or non-abutting cells and/or cell sectors) may transmit reference signals according to a same chain of Reference Lists because there is little or no danger of interference. Chains of Reference Lists can be chosen and assigned to wireless regions such that no devices of adjacent wireless regions transmit the same Reference Sequence with the same Cyclic Shift during the same reference signal time period. As used herein, "adjacent regions" are any two cells that are located close enough together such that a wireless signal transmitted by a device located within one of the two regions may be received (possibly as simple interference) by a device located in the other of the two regions. However, to be adjacent, the two regions need not share a physical boundary and/or border. The devices of a particular region may transmit the same reference signal during each reference signal time period, and/or may transmit different modified versions (e.g., cyclically shifted versions) of the same reference signal within each signal time period. Finally, it is also possible to construct and use chains of Cyclic-Shift Lists, and assign them to different wireless regions.

In some examples, the example Geographical RS Planner 802 of FIG. 8 determines and/or assigns chains of Reference Lists and/or chains of Shifts Lists values to regions (i.e., cells and/or cells sectors) and/or UEs. The example Geographical RS Planner 802 forms one or more chains of Reference Lists, and assigns them to regions based upon their relative geographic locations. The example Geographical RS Planner 802 assigns the chains of Reference Lists to the regions based on the network topology information 801 that defines the geographic locations (e.g., absolute and/or relative) of the wireless communication regions. The example network topology information 801 may be stored and/or implemented using any type of data structure(s). The Geographical RS Planner 802 may likewise form and/or allocate chains of Shift Lists. The example Geographical RS Planner 802 provides the chains of Reference Lists (or one or more values from which they may be computed and/or inferred) and/or the chains of Shift Lists (or one or more values from which they may be computed and/or inferred) to the regions and/or, more particularly, to wireless base stations for use by the base stations, and for the base stations to provide to their associated UEs.

As described above in connection with FIGS. 5 and 6, to control and/or coordinate the use of chains of Reference Lists and/or chains of Shift Lists by wireless regions, wireless base stations, and/or UEs, the wireless communication systems may include and/or utilize time and shared information 514, 615. In addition to the example time and shared information 514, 614 discussed above, additional examples of time and shared information 514, 614 include, but are not limited to, any number and/or type(s) of time signals, timing beacons, clocks, identifier assigner, etc. that allow the base stations and/or the UEs to determine, compute and/or infer which Reference Sequence, and/or Cyclic Shift should be used during any particular time interval. For example, the time and shared information 514, 614 may be a value that represents an OFDM frame and/or sub-frame count.

Figure 18:
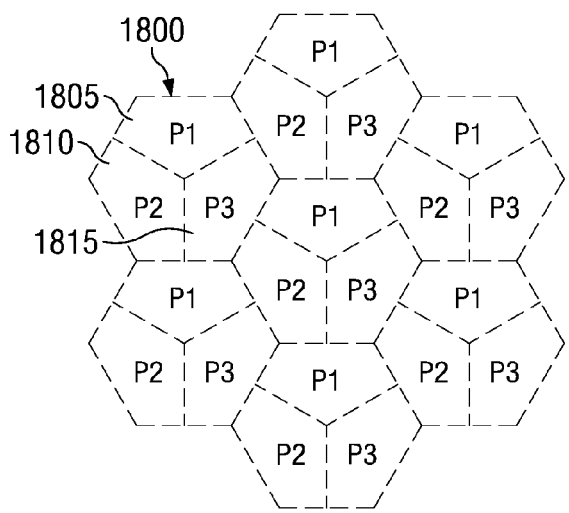
Figure 19:
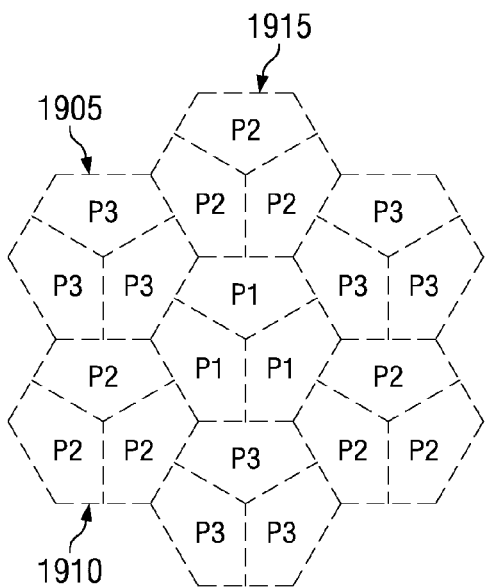
Figure 20:
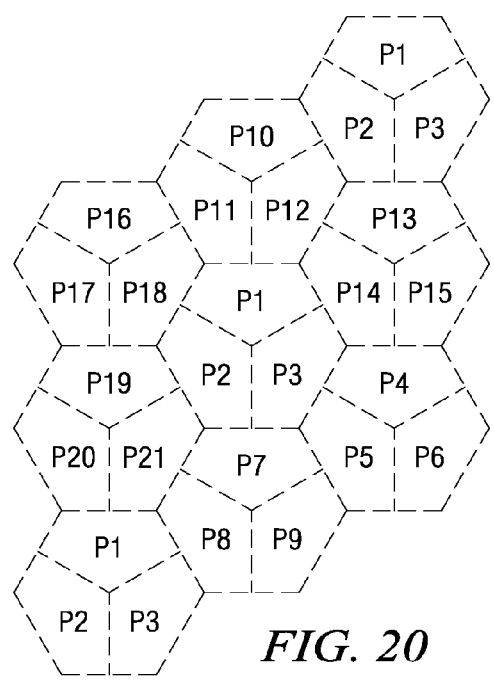

FIGS. 18, 19 and 20 illustrate example assignments of chains of Reference Lists to wireless regions (e.g., to wireless communication cells and/or sectors of wireless communication cells of a wireless communication system). In the examples of FIGS. 18, 19 and 20, each area covered by a NodeB is divided into three cells. For example, an example area 1800 of FIG. 18 is divided into three cells 1805, 1810 and 1815. While example chains of Reference Lists to regions are illustrated in FIGS. 18, 19 and 20, persons of ordinary skill in the art will readily appreciate that chains of Reference Lists may be assigned to regions in any pattern(s) and/or to satisfy any criteria.

In the illustrated example of FIG. 18, the same chain(s) of Reference Lists are assigned to each NodeB (all NodeBs use P1, P2, P3). However, each cell belonging to the NodeB is assigned a different chain of Reference List. For example, a region 1805 is assigned chain of Reference Lists P1, a region 1810 is assigned chain of Reference Lists P2, and a region 1815 is assigned chain of Reference Lists P3. Chains of Shift Lists may be similarly assigned. Thus, devices of a particular region use a different chain of Reference Lists and/or chain of Shift Lists than devices of any neighboring region (of the same and/or a different cell), thus, substantially reducing interference among the devices.

In the illustrated example of FIG. 19, all cells of each NodeB region (1905, 1915, and 1910) are assigned the same chain of Reference Lists. However, the chain of Reference Lists assigned to each cell is different from any chain of Reference Lists assigned to each of the neighboring NodeB cells. Chains of Shift Lists may be similarly assigned. Thus, devices of a particular region (e.g., the cell 1905) use a different chain of Reference Lists (e.g., P3) and/or a different chain of Shift Lists than devices of any neighboring region (e.g., the cells 1910 and 1915), thus, substantially reducing interference among the devices. As said before, chains of Shift Lists are also possible in reference to FIG. 19.

In the illustrated example of FIG. 20, each cell of each NodeB is assigned a different chain of Reference Lists. Chains of Shift Lists may be similarly assigned. Thus, devices of a particular region use a different chain of Reference Lists and/or different chain of Shift Lists than devices of any neighboring regions, thereby substantially reducing interference among the devices.

The example wireless base stations and/or the example UEs may be, for example, implemented to modulate and transmit reference signals and/or symbols in accordance with one or more past, present and/or future wired and/or wireless communication standards and/or specifications, such as the E-UTRA specification currently being defined by 3GPP. However, the said wireless devices may be implemented to modulate and transmit reference signals and/or symbols in accordance with any additional and/or alternative past, present and/or future technology(-ies), standard(s) and/or specification(s) such as, for example, the IEEE) 802.11x family of standards, WCDMA, TDMA, FDMA, OFDMA, SC-OFDMA, DFT-spread OFDMA, and/or any combination thereof.

While methods and apparatus to allocate reference signals are described herein, persons of ordinary skill in the art will readily appreciate that the methods and/or apparatus described may also be used to allocate other types of reference signals for wireless communication systems such as, for example, wireless local area networks (WLANs), mesh networks and/or sensor networks. Moreover, the methods and/or apparatus described herein may be used to control pilot and/or reference signals for other types of communication systems such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    applying a first cyclic shift to a first reference sequence during a first time interval of a signal;
    applying a second cyclic shift to a second reference sequence during a second time interval of the signal, wherein the first cyclic shift differs from the second cyclic shift; and
    the first and second cyclic shifts are members of a set of cyclic shifts assigned to devices of a wireless region.

2. A method as defined in claim 1, wherein the set of cyclic shifts defines an order in which devices of the wireless region are to apply cyclic shifts.

3. A method as defined in claim 1, wherein the first reference sequence is substantially randomly selected.

4. A method as defined in claim 1, further comprising selecting the first and second reference sequence from a set of reference sequences assigned to devices of a wireless region.

5. A method as defined in claim 4, wherein the set of reference sequences defines an order in which devices of the wireless region are to select a reference sequence.

6. A method as defined in claim 1, wherein the first wireless device is at least one of a user endpoint, a mobile station, a mobile terminal, an access point, a nodeB, a fixed station, wireless communication cell or wireless communication cell sector.

7. A method as defined in claim 1, wherein the first wireless device is at least one of an access point, a nodeB, a fixed station, or a cell tower, and wherein the second wireless device is at least one of a user endpoint, a mobile station, or a mobile terminal.

8. A method as defined in claim 1, wherein the first reference sequence and the second reference sequence are transmitted to the same wireless device during different time intervals.

9. A method as defined in claim 1, wherein the first reference sequence and the second reference sequence are the same.

10. An apparatus comprising:
    a reference signal generator comprising:
        a sequence selector to select a first reference sequence from a group of reference sequences assigned to a first wireless region and
        a second reference sequence from a group of reference sequences assigned to a second wireless region;
        a cyclic shift selector to select a first cyclic shift for a first time interval from a group of cyclic shifts assigned to a first wireless region;
    a cyclic shifter to cyclically shift solely the first reference sequence based on the selected first cyclic shift to form a first reference signal; and
    a transmit adapter to transmit the first reference signal during the first time interval via the wireless channel.

11. An apparatus as defined in claim 10, wherein the cyclic shift selector is to select a second cyclic shift for a second time interval from a group of cyclic shifts assigned to a second wireless region; and
    wherein the cyclic shifter is to cyclically shift solely the reference sequence based on the second selected cyclic shift during a second time interval.

12. An apparatus as defined in claim 10, wherein the selection is based upon at least one of a frame number, a sub-frame offset, a slot offset, a transmitted symbol offset, a wireless region identifier, a NodeB identifier, a user endpoint identifier or a group identifier.

13. An apparatus as defined in claim 10, further comprising a modulator to modulate the first reference sequence, the modulator comprising:
    a Fourier transform module to perform a Fourier transform of the first reference sequence;
    an inverse Fourier transform module to perform an Inverse Fourier transform; and
    an interface to map outputs of the Fourier transform to selected inputs of the Inverse Fourier transform.

* * * * *